(12) United States Patent
Can et al.

(10) Patent No.: US 10,909,313 B2
(45) Date of Patent: Feb. 2, 2021

(54) PERSONALIZED SUMMARY GENERATION OF DATA VISUALIZATIONS

(71) Applicant: SAS Institute Inc., Cary, NC (US)

(72) Inventors: Ethem F. Can, Cary, NC (US);
Richard W. Crowell, Cary, NC (US);
James Tetterton, Holly Springs, NC (US); Jared Peterson, Cary, NC (US);
Saratendu Sethi, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 553 days.

(21) Appl. No.: 15/630,462

(22) Filed: Jun. 22, 2017

(65) Prior Publication Data

US 2017/0371856 A1 Dec. 28, 2017

Related U.S. Application Data

(60) Provisional application No. 62/353,222, filed on Jun. 22, 2016.

(51) Int. Cl.
*G06F 40/186* (2020.01)
*G06K 9/68* (2006.01)
(Continued)

(52) U.S. Cl.
CPC ........ *G06F 40/186* (2020.01); *G06F 16/5846* (2019.01); *G06F 40/194* (2020.01);
(Continued)

(58) Field of Classification Search
CPC .. G06F 3/0481; G06F 3/0484; G06F 3/04847; G06F 9/542; G06F 17/30525;
(Continued)

(56) References Cited

U.S. PATENT DOCUMENTS 7,567,715 B1 * 7/2009 Zhu .................. G06K 9/4638
382/199
8,245,135 B2 8/2012 Cai et al.
(Continued)

OTHER PUBLICATIONS

Zhu et al., "Generating Text Description from Content-based Annotated Image", 2012 International Conference on Systems and Informatics (ICSAI 2012), 5 pages.
(Continued)

*Primary Examiner* — Abedelali Serrou
(74) *Attorney, Agent, or Firm* — Kacvinsky Daisak Bluni PLLC

(57) ABSTRACT

Various embodiments are generally directed to systems for summarizing data visualizations (i.e., images of data visualizations), such as a graph image, for instance. Some embodiments are particularly directed to a personalized graph summarizer that analyzes a data visualization, or image, to detect pre-defined patterns within the data visualization, and produces a textual summary of the data visualization based on the pre-defined patterns detected within the data visualization. In various embodiments, the personalized graph summarizer may include features to adapt to the preferences of a user for generating an automated, personalized computer-generated narrative. For instance, additional pre-defined patterns may be created for detection and/or the textual summary may be tailored based on user preferences. In some such instances, one or more of the user preferences may be automatically determined by the personalized graph summarizer without requiring the user to explicitly indicate them. Embodiments may integrate machine learning and computer vision concepts.

30 Claims, 35 Drawing Sheets

(51) Int. Cl.
G06K 9/46 (2006.01)
G06F 16/583 (2019.01)
G06K 9/62 (2006.01)
G06K 9/00 (2006.01)
G06N 20/00 (2019.01)
G06K 9/32 (2006.01)
G06F 40/56 (2020.01)
G06F 40/194 (2020.01)

(52) U.S. Cl.
CPC ......... *G06F 40/56* (2020.01); *G06K 9/00449* (2013.01); *G06K 9/3233* (2013.01); *G06K 9/469* (2013.01); *G06K 9/4642* (2013.01); *G06K 9/6201* (2013.01); *G06K 9/6267* (2013.01); *G06K 9/6892* (2013.01); *G06N 20/00* (2019.01); *G06K 9/4676* (2013.01)

(58) Field of Classification Search
CPC ......... G06F 17/30548; G06F 17/30554; G06F 17/40; G06F 19/3481; G06F 19/3487; G06F 11/3409; G06F 17/20; G06F 17/21; G06F 17/24; G06F 17/274; G06F 17/2881; G06F 17/30439; G06F 17/30964; G06F 17/30967; G06F 19/00; G06F 3/04817; G06F 3/04842; G06F 17/3056; G06F 17/30958; G06F 17/2785; G06F 17/277; G06F 17/2765; G06F 17/30684; G06F 17/30734; G06F 17/2705; G06F 17/30268; G06F 17/30663; G06F 17/30675; G06F 17/211; G06F 17/271; G06F 17/2775; G06F 17/28; G06F 17/30011; G06F 17/30477; G06F 17/30528; G06F 17/3053; G06F 17/30867; G06F 17/30994; G06F 40/186; G06F 40/56; G06F 40/194; G06F 16/5846; G06F 17/30705; G06F 17/30716; G06F 17/2745; G06F 3/04812; G10L 25/45; G06K 9/6267; G06K 9/6201; G06K 9/00449; G06K 9/4642; G06K 9/3233; G06K 9/6892; G06K 9/469; G06K 9/4676; G06N 20/00
See application file for complete search history.

(56) References Cited

U.S. PATENT DOCUMENTS

| | | | | |
|---|---|---|---|---|
| 8,671,353 B1* | 3/2014 | Varadarajan | ....... | G06Q 30/0201 715/763 |
| 9,129,448 B2 | 9/2015 | Bekmambetov et al. | | |
| 9,471,636 B2* | 10/2016 | Bornea | ............. | G06F 16/24578 |
| 9,692,768 B1* | 6/2017 | Kayyoor | ............ | H04L 63/0421 |
| 2006/0222243 A1* | 10/2006 | Newell | ............. | G06K 9/00295 382/173 |
| 2007/0273696 A1* | 11/2007 | Cheng | ................ | G06K 9/00771 345/467 |
| 2009/0240682 A1* | 9/2009 | Balmin | ................. | G06F 16/248 |
| 2010/0070921 A1* | 3/2010 | Rieman | ................... | G06F 15/16 715/811 |
| 2010/0161680 A1 | 6/2010 | Atre et al. | | |
| 2014/0176555 A1* | 6/2014 | Kuo | ...................... | G06T 11/206 345/440 |
| 2014/0184607 A1* | 7/2014 | Toyoshima | ......... | G06F 17/2765 345/440 |
| 2014/0214936 A1* | 7/2014 | Abraham | .............. | H04W 4/206 709/204 |
| 2015/0077419 A1* | 3/2015 | Abuelsaad | ........... | G06T 11/206 345/440 |
| 2015/0138203 A1* | 5/2015 | Nachmanson | ........ | G06T 11/206 345/440 |
| 2015/0317302 A1* | 11/2015 | Liu | ........................ | G06F 17/28 704/9 |
| 2016/0104076 A1* | 4/2016 | Maheshwari | .......... | G06N 20/00 706/12 |
| 2016/0299881 A1* | 10/2016 | Gupta | ..................... | G06F 17/24 |
| 2017/0185835 A1* | 6/2017 | Appel | ................ | G06K 9/00476 |

OTHER PUBLICATIONS

"Add alternative text to a shape, picture, chart, table, SmartArt graphic, or other object—Office Support", Jun. 17, 2016, 5 pages (author unknown).

"Add text descriptions to data points MATLAB text", <<http://www.mathworks.com/help/matlab/ref/text.html?requestedDomain=www.mathworks.com>>, Jun. 16, 2017, 16 pages (author unknown).

Hirst, Tony, "First Thoughts on Automatically Generating Accessible Text Descriptions of ggplot Charts in R | Rbloggers", <<http://www.rbloggers.com/firstthoughtsonautomaticallygeneratingaccessibletextdescriptionsofggplotchartsinr/>>, Apr. 29, 2016, 9, pages.

Chhabra et al., "Generating Text Summaries of Graph Snippets", The 19th International Conference on Management of Data (COMAD), Dec. 19-21, 2013, 4 pages.

"Narratives for Business Intelligence", Integrated Narratives for Business Intelligence | Narrative Science, <<https://www.narrativescience.com/narrativesbusinessintelligence>>,Jul. 26, 2017, 9 pages, (author unknown).

"R: Add Text to a Plot", <<https://stat.ethz.ch/Rmanual/Rdevel/library/graphics/html/text.html>>, Jun. 17, 2016, 3 pages, author unknown.

"Welcome to the iGraphLite page", <<http://www.inf.udec.cl/~leo/igraph.html>>, Jun. 20, 2017, 3 pages, author unknown.

Chhabra, Shruti, "Entity-centric Summarization: Generating Text Summaries for Graph Snippets", International World Wide Web Conference Committee (IW3C2), WWW'14 Companion, Apr. 7-11, 2014, 5 pages.

* cited by examiner

Example images 1320

Original image 1322

Highlighted image 1324

Region of interest (ROI) 1334

PERSONALIZED SUMMARY GENERATION OF DATA VISUALIZATIONS

CROSS-REFERENCE TO RELATED APPLICATIONS

This application claims the benefit of priority under 35 U.S.C. § 119(e) to U.S. Provisional Application Ser. No. 62/353,222 filed Jun. 22, 2016, the entirety of which is incorporated herein by reference.

BACKGROUND

Generally, data visualizations may refer to various techniques used to communicate data or information by encoding it as visual objects (e.g., points, lines, bars, etc.) contained in graphics. Typically, a data visualization includes information that has been abstracted in some schematic form, and may include attributes or variables for the units of information. For instance, numerical data may be encoded using dots, lines, or bars, to visually communicate a quantitative message. Sometimes portions of a data visualization may include information that may be of particular interest, such as a spike in values.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, may cause the processor to perform operations comprising one or more of: identify a data visualization comprising a graph image; determine a set of graph-type correlation scores for the graph image, the set of graph-type correlation scores to include a graph-type correlation score for each graph type of a plurality of graph types, each graph-type correlation score based on a comparison of at least a portion of the graph image with one or more graph-type models associated with each graph type of the plurality of graph types; evaluate the set of graph-type correlation scores to identify a graph type of the graph image; retrieve a set of patterns based on the graph type of the graph image, each pattern in the set of patterns to include one or more pattern examples; determine a set of region of interest correlation scores for the graph image based on matching the one or more pattern examples of each pattern in the set of patterns with at least a portion of the graph image, the set of region of interest correlation scores to include at least one region of interest correlation score for each pattern in the set of patterns; evaluate the set of region of interest correlation scores to identify one or more candidate regions of interest of the graph image, each of the one or more candidate regions of interest to include a portion of the graph image; retrieve a set of pattern models based on the set of candidate regions of interest of the graph image, each candidate region of interest in the set of candidate regions of interest associated with one pattern model in the set of pattern models, and each pattern model in the set of pattern models associated with one pattern in the set of patterns; compare each candidate region of interest in the set of candidate regions of interest to an associated pattern model in the set of pattern models to determine a set of pattern model correlation scores, the set of pattern model correlation scores to include a pattern model correlation score for each candidate region of interest of the one or more candidate regions of interest; identify one or more detected patterns based on the set of pattern model correlation scores; retrieve one or more text templates based on the one or more detected patterns, the one or more text templates to include at least one portion of text associated with each detected pattern of the one or more detected patterns, each text template of the one or more text templates associated with a priority level; arrange the one or more text templates in an order based on the priority level associated with each text template to generate a textual description of the graph image; and produce a personalized summary of the graph image, the summary of the graph image comprising the graph image and the textual description of the graph image.

In some embodiments, the processor of the apparatus may be caused to perform operations comprising one or more of: detect a portion of the graph image with contextual information; extract a textual element from the portion of the graph image with contextual information; and insert at least a portion of the textual element extracted from the portion of the graph image with contextual information into at least one text template of the one or more text templates to generate the textual description of the graph image.

In one or more embodiments, the processor of the apparatus may be caused to perform operations comprising one or more of: identify a component of the graph image based on the graph type; detect a portion of the graph image with potential contextual information; and determine contextual information is absent from the portion of the graph image with potential contextual information based on the component of the graph image identified based on the graph type.

In various embodiments, matching a pattern example of a pattern in the set of patterns with at least a portion of the graph image may comprise one or more of: overlay at least a portion of the pattern example on the graph image in a plurality of positions; and compute a region of interest correlation score in the set of region of interest correlation scores for each of the plurality of positions.

In some embodiments, the processor of the apparatus may be caused to perform operations comprising one or more of: receive an additional pattern example; and update a pattern model in the set of pattern models based on the additional pattern example.

In one or more embodiments, each pattern model correlation score may indicate a likelihood of a respective candidate region of interest of the one or more candidate regions of interest including an associated pattern.

In various embodiments, the processor of the apparatus may be caused to perform operations comprising one or more of: present the one or more text templates arranged based on the priority level associated with each template sentence via a user interface; arrange the one or more text templates in an updated order based on input received via the user interface; alter a priority level of at least one of the one or more text templates based on the updated order; and generate the textual description of the graph image based on the priority level associated with each text template, the priority level associated with each text template to include the priority level of the at least one of the one or more text templates altered based on the updated order.

In some embodiments, the processor of the apparatus may be caused to perform operations comprising: alter the priority level of a text template based on the input received via a user interface.

In one or more embodiments, at least one pattern in the set of patterns may comprise a personalized pattern. In one or more such embodiments, the processor of the apparatus may be cause to perform operations comprising create the personalized pattern based on one or more example graph images and one or more pattern examples identified in the example graph images based on input received via a user interface.

In various embodiments, the processor of the apparatus may be caused to perform operations comprising associate one or more of: a priority level, a template sentence, or a graph type with the personalized pattern based on input received via the user interface.

Some embodiments described herein may include a computer-implemented method, comprising one or more of: identifying a data visualization comprising a graph image; determining a set of graph-type correlation scores for the graph image, the set of graph-type correlation scores to include a graph-type correlation score for each graph type of a plurality of graph types, each graph-type correlation score based on a comparison of at least a portion of the graph image with one or more graph-type models associated with each graph type of the plurality of graph types; evaluating the set of graph-type correlation scores to identify a graph type of the graph image; retrieving a set of patterns based on the graph type of the graph image, each pattern in the set of patterns to include one or more pattern examples; determining a set of region of interest correlation scores for the graph image based on matching the one or more pattern examples of each pattern in the set of patterns with at least a portion of the graph image, the set of region of interest correlation scores to include at least one region of interest correlation score for each pattern in the set of patterns; evaluating the set of region of interest correlation scores to identify one or more candidate regions of interest of the graph image, each of the one or more candidate regions of interest to include a portion of the graph image; retrieving a set of pattern models based on the set of candidate regions of interest of the graph image, each candidate region of interest in the set of candidate regions of interest associated with one pattern model in the set of pattern models, and each pattern model in the set of pattern models associated with one pattern in the set of patterns; comparing each candidate region of interest in the set of candidate regions of interest to an associated pattern model in the set of pattern models to determine a set of pattern model correlation scores, the set of pattern model correlation scores to include a pattern model correlation score for each candidate region of interest of the one or more candidate regions of interest; identifying one or more detected patterns based on the set of pattern model correlation scores; retrieving one or more text templates based on the one or more detected patterns, the one or more text templates to include at least one portion of text associated with each detected pattern of the one or more detected patterns, each text template of the one or more text templates associated with a priority level; arranging the one or more text templates in an order based on the priority level associated with each text template to generate a textual description of the graph image; and generating a personalized summary of the graph image, the summary of the graph image comprising the graph image and the textual description of the graph image.

In various embodiments, the computer-implemented method may include one or more of: detecting a portion of the graph image with contextual information; extracting a textual element from the portion of the graph image with contextual information; and inserting at least a portion of the textual element extracted from the portion of the graph image with contextual information into at least one text template of the one or more text templates to generate the textual description of the graph image.

In one or more embodiments, the computer-implemented method may include one or more of: identifying a component of the graph image based on the graph type; detecting a portion of the graph image with potential contextual information; and determining contextual information is absent from the portion of the graph image with potential contextual information based on the component of the graph image identified based on the graph type.

In some embodiments, matching a pattern example of a pattern in the set of patterns with at least a portion of the graph image may comprise one or more of: overlaying at least a portion of the pattern example on the graph image in a plurality of positions; and computing a region of interest correlation score in the set of region of interest correlation scores for each of the plurality of positions.

In various embodiments, the computer-implemented method may include one or more of: receiving an additional pattern example; and updating a pattern model in the set of pattern models based on the additional pattern example.

In one or more embodiments, each pattern model correlation score may indicate a likelihood of a respective candidate region of interest of the one or more candidate regions of interest including an associated pattern.

In some embodiments, the computer-implemented method may include one or more of: presenting the one or more text templates arranged based on the priority level associated with each template sentence via a user interface; arranging the one or more text templates in an updated order based on input received via the user interface; altering a priority level of at least one of the one or more text templates based on the updated order; and generating the textual description of the graph image based on the priority level associated with each text template, the priority level associated with each text template to include the priority level of the at least one of the one or more text templates altered based on the updated order.

In various embodiments, the computer-implemented method may include altering the priority level of a text template based on the input received via a user interface.

In one or more embodiments, at least one pattern in the set of patterns comprising a personalized pattern. In one or more such embodiments, the computer-implemented method may include creating the personalized pattern based on one or more example graph images and one or more pattern examples identified in the example graph images based on input received via a user interface.

In some embodiments, the computer-implemented method may include associating one or more of a priority level, a template sentence, or a graph type with the personalized pattern based on input received via the user interface.

Various embodiments described herein may include a computer-program product tangibly embodied in a non-transitory machine-readable storage medium, the computer-program product including instructions operable to cause a processor to perform operations comprising one or more of: identify a data visualization comprising a graph image; determine a set of graph-type correlation scores for the graph image, the set of graph-type correlation scores to include a graph-type correlation score for each graph type of a plurality of graph types, each graph-type correlation score based on a comparison of at least a portion of the graph image with one or more graph-type models associated with each graph type of the plurality of graph types; evaluate the set of graph-type correlation scores to identify a graph type of the graph image; retrieve a set of patterns based on the graph type of the graph image, each pattern in the set of patterns to include one or more pattern examples; determine a set of region of interest correlation scores for the graph image based on matching the one or more pattern examples of each pattern in the set of patterns with at least a portion of the graph image, the set of region of interest correlation scores to include at least one region of interest correlation score for each pattern in the set of patterns; evaluate the set of region of interest correlation scores to identify one or more candidate regions of interest of the graph image, each of the one or more candidate regions of interest to include a portion of the graph image; retrieve a set of pattern models based on the set of candidate regions of interest of the graph image, each candidate region of interest in the set of candidate regions of interest associated with one pattern model in the set of pattern models, and each pattern model in the set of pattern models associated with one pattern in the set of patterns; compare each candidate region of interest in the set of candidate regions of interest to an associated pattern model in the set of pattern models to determine a set of pattern model correlation scores, the set of pattern model correlation scores to include a pattern model correlation score for each candidate region of interest of the one or more candidate regions of interest; identify one or more detected patterns based on the set of pattern model correlation scores; retrieve one or more text templates based on the one or more detected patterns, the one or more text templates to include at least one portion of text associated with each detected pattern of the one or more detected patterns, each text template of the one or more text templates associated with a priority level; arrange the one or more text templates in an order based on the priority level associated with each text template to generate a textual description of the graph image; and generate a personalized summary of the graph image, the summary of the graph image comprising the graph image and the textual description of the graph image.

In some embodiments, the computer-program product may include instructions operable to cause the processor to perform operations comprising one or more of: detect a portion of the graph image with contextual information; extract a textual element from the portion of the graph image with contextual information; and insert at least a portion of the textual element extracted from the portion of the graph image with contextual information into at least one text template of the one or more text templates to generate the textual description of the graph image.

In one or more embodiments, the computer-program product may include instructions operable to cause the processor to perform operations comprising one or more of: identify a component of the graph image based on the graph type; detect a portion of the graph image with potential contextual information; and determine contextual information is absent from the portion of the graph image with potential contextual information based on the component of the graph image identified based on the graph type.

In various embodiments, to match a pattern example of a pattern in the set of patterns with at least a portion of the graph image, the computer-program product may include instructions operable to cause the processor to perform operations comprising one or more of: overlay at least a portion of the pattern example on the graph image in a plurality of positions; and compute a region of interest correlation score in the set of region of interest correlation scores for each of the plurality of positions.

In some embodiments, the computer-program product may include instructions operable to cause the processor to perform operations comprising one or more of: receive an additional pattern example; and update a pattern model in the set of pattern models based on the additional pattern example.

In one or more embodiments, each pattern model correlation score may indicate a likelihood of a respective candidate region of interest of the one or more candidate regions of interest including an associated pattern.

In various embodiments, the computer-program product may include instructions operable to cause the processor to perform operations comprising one or more of: present the one or more text templates arranged based on the priority level associated with each template sentence via a user interface; arrange the one or more text templates in an updated order based on input received via the user interface; alter a priority level of at least one of the one or more text templates based on the updated order; and generate the textual description of the graph image based on the priority level associated with each text template, the priority level associated with each text template to include the priority level of the at least one of the one or more text templates altered based on the updated order.

In some embodiments, the computer-program product may include instructions operable to cause the processor to perform operations comprising alter the priority level of a text template based on the input received via a user interface.

In one or more embodiments, at least one pattern in the set of patterns may comprise a personalized pattern. In one or more such embodiments, the computer-program product may include instructions operable to cause the processor to perform operations comprising: create the personalized pattern based on one or more example graph images and one or more pattern examples identified in the example graph images based on input received via a user interface.

In various embodiments, the computer-program product may include instructions operable to cause the processor to perform operations comprising: associate one or more of a priority level, a template sentence, or a graph type with the personalized pattern based on input received via the user interface.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

DETAILED DESCRIPTION

Figure 1:
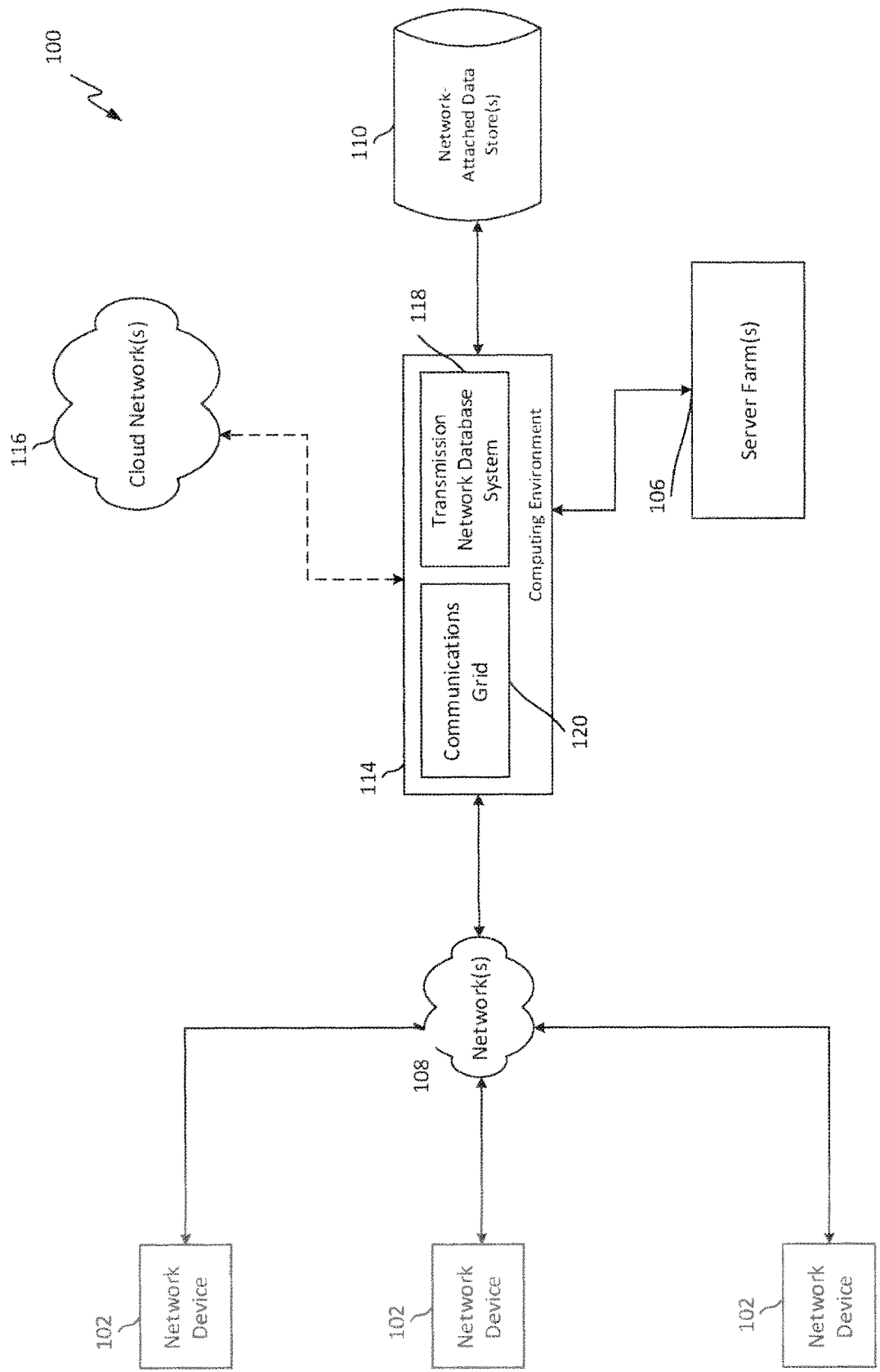
FIG. 1 illustrates a block diagram that provides an illustration of the hardware components of a computing system, according to some embodiments of the present technology.

Various embodiments are generally directed to systems for summarizing data visualizations (i.e., images of data visualizations), such as a graph image, for instance. Some embodiments are particularly directed to a personalized graph summarizer that analyzes a data visualization, or image, to detect pre-defined patterns within the data visualization, and produces a textual summary of the data visualization based on the pre-defined patterns detected within the data visualization. In various embodiments, the personalized graph summarizer may include features to adapt to the preferences of a user, thus providing a personalized computer-generated narrative. For instance, additional pre-defined patterns may be created for detection and/or the textual summary may be tailored based on user preferences. In some such instances, one or more of the user preferences may be automatically determined by the personalized graph summarizer without requiring the user to explicitly indicate them. This and other embodiments are described and claimed.

Some challenges facing systems for summarizing data visualizations include the inability to provide a meaningful summary tailored to the preferences of a user. These challenges may result from the inputs required by systems to summarize data visualizations. For example, systems may require annotations of a data visualization as inputs. In a further example, various systems may require a data file that includes the underlying data or information to be communicated by a data visualization in order to summarize the data visualization. It will be appreciated, as used herein a data visualization (i.e. image of a data visualization) may include or refer to image data or an image file (e.g., Joint Photographic Experts Group (JPEG), Portable Network Graphics (PNG), graphic interchange format (GIF), Scalable Vector Graphics (SVG), and other image file formats), however, a data visualization is separate and distinct from a data file that includes the underlying data or information to be communicated by the data visualization (e.g., Comma-Separated Values (CSV), Extensible Markup Language (XML), Data Interchange Format (DIF), Excel Binary File Format (XLS), and similar file formats). For instance, an image file may include pixel data for displaying an image of a scatter graph, while a data file may include numerical values corresponding to points in the scatter graph.

Adding further complexity, the types of data visualizations and the patterns therein that need to be detected and summarized may vary among users. For example, industry-specific patterns may need to be identified and summarized. Further, different emphasis may be placed on different portions of a data visualization by different users. For instance, one user may place more emphasis on upward trends, while another user places more emphasis on downward trends. These and other factors may result in systems for summarizing data visualizations with poor performance and limited capabilities. An additional source of complexity includes the inability to provide relevant, informative, and/or customized summaries of data visualizations. For example, some systems may summarize a data visualizations by merely restating the title of the data visualization. Such limitations can drastically reduce the usability and applicability of the data visualization summaries, contributing to inefficient systems with limited flexibility.

Various embodiments described herein include a personalized graph summarizer that can generate relevant and useful summaries of data visualizations without relying on annotations or data files that include underlying data or information to be communicated by the data visualization. For instance, the personalized graph summarizer may generate a natural-language textual summary of a data visualization based on pre-defined patterns detected in an image file that comprises the data visualization. In some embodiments, the personalized graph summarizer may be able to learn additional types of data visualizations and/or patterns to detect therein. For example, a personalized graph summarizer may learn to identify and summarize a candlestick chart. In one or more embodiments, the personalized graph summarizer may be able to generate and/or tailor summaries of data visualizations based on user preferences. In one or more such embodiments, the personalized graph summarizer may learn user preferences based on interactions of the user with the personalized graph summarizer. For instance, the personalized graph summarizer may order one or more sentences in a summary based on revisions made by the user to a previous summary generated for a previous data visualization. In various embodiments, the personalized graph summarizer may include the ability to extract context from a data visualization. In various such embodiments, the personalized graph summarizer may tailor a summary of a data visualization based on context extracted from the data visualization. For example, axis-labels may be extracted from a data visualization and used to include units (e.g., dollars, years, etc.) in a summary of the data visualization. In some embodiments, a personalized computer-generated narrative can be automatically generated for one or more data visualizations.

In these and other ways the personalized graph summarizer may enable customized, efficient, and accurate detection of patterns in a data visualization to provide relevant and useful summaries of the data visualization, resulting in several technical effects and advantages. In various embodiments, the personalized graph summarizer may be implemented via one or more computing devices, and thereby provide additional and useful functionality to the one or more computing devices, resulting in more capable and better functioning computing devices. For example, the personalized graph summarizer may enable a computing device to assist the visually impaired with interpreting and understanding data visualizations. One or more embodiments can involve computer vision.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
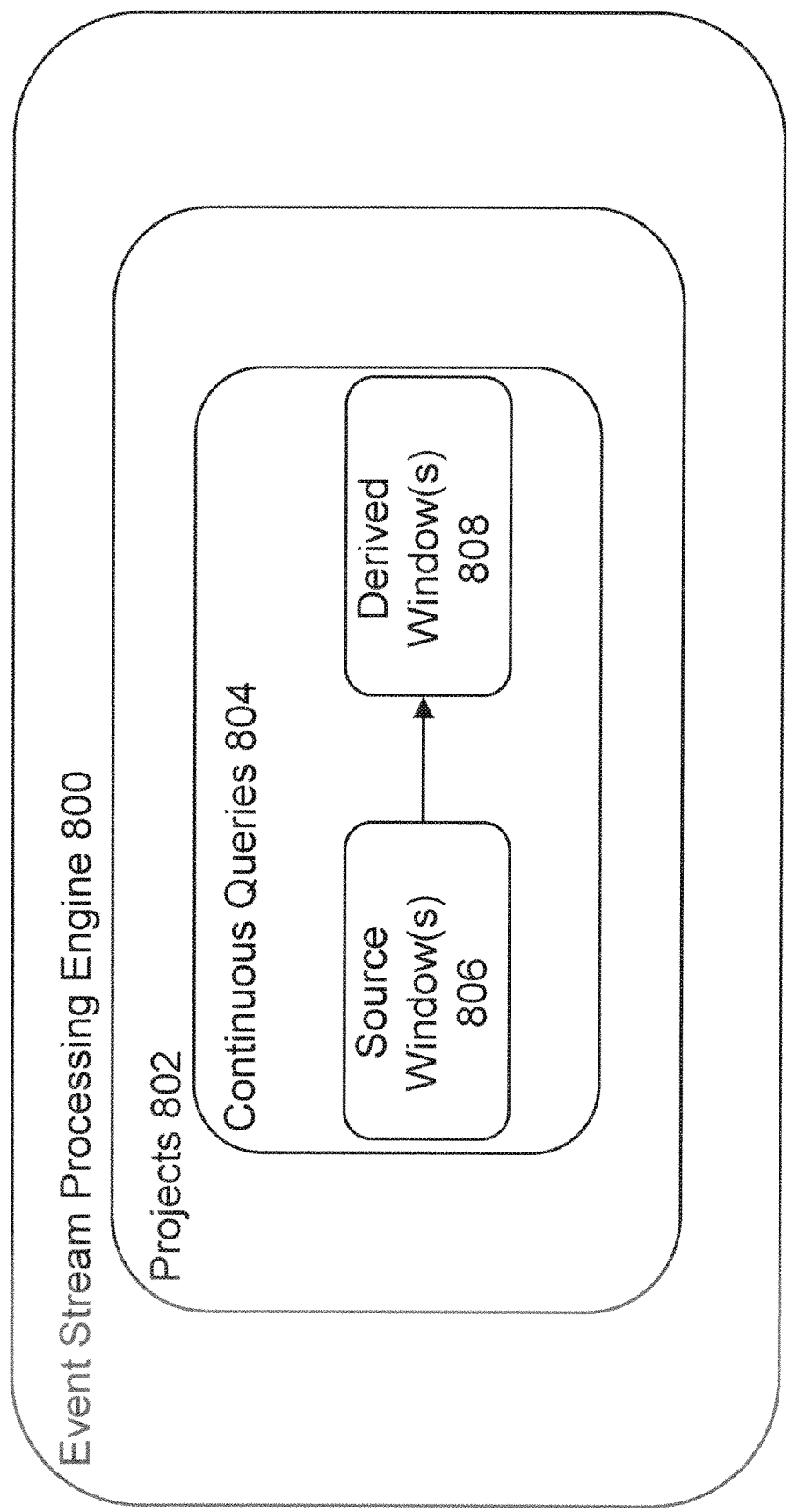
FIG. 8 illustrates a block diagram including components of an Event Stream Processing Engine (ESPE), according to embodiments of the present technology.
Figure 9:
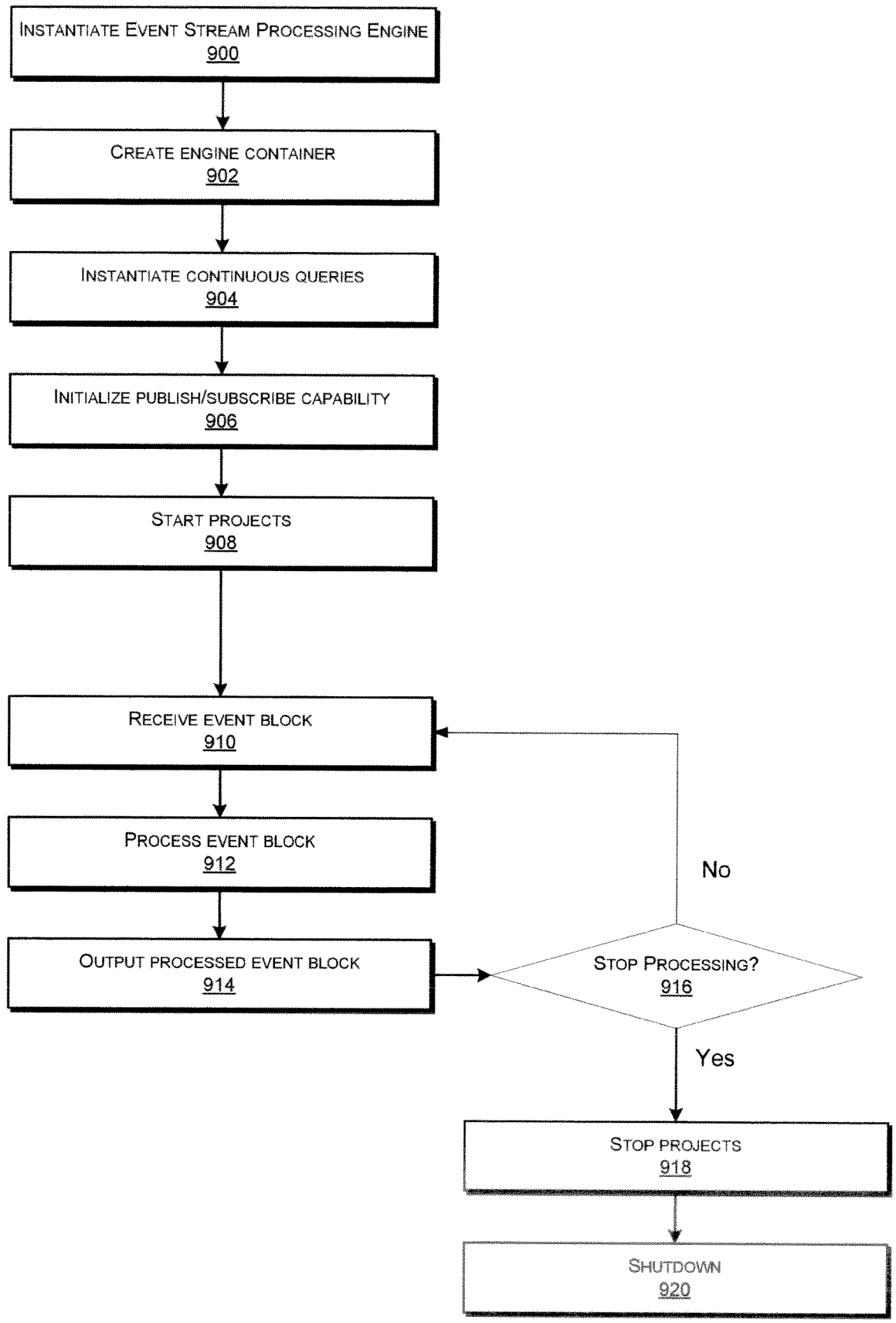
FIG. 9 illustrates a flow chart showing an example process including operations performed by an event stream processing engine, according to some embodiments of the present technology.
Figure 10:
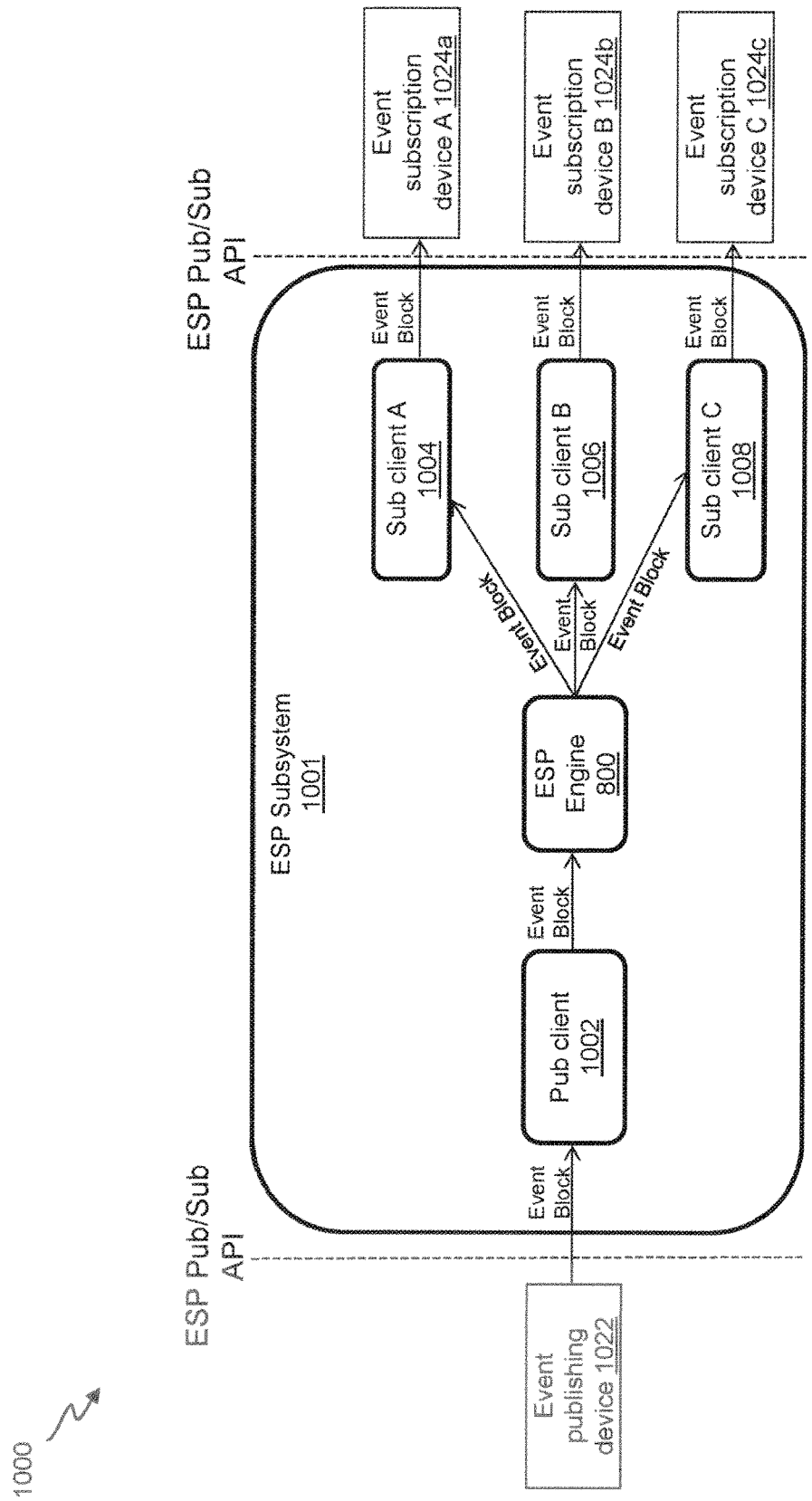
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
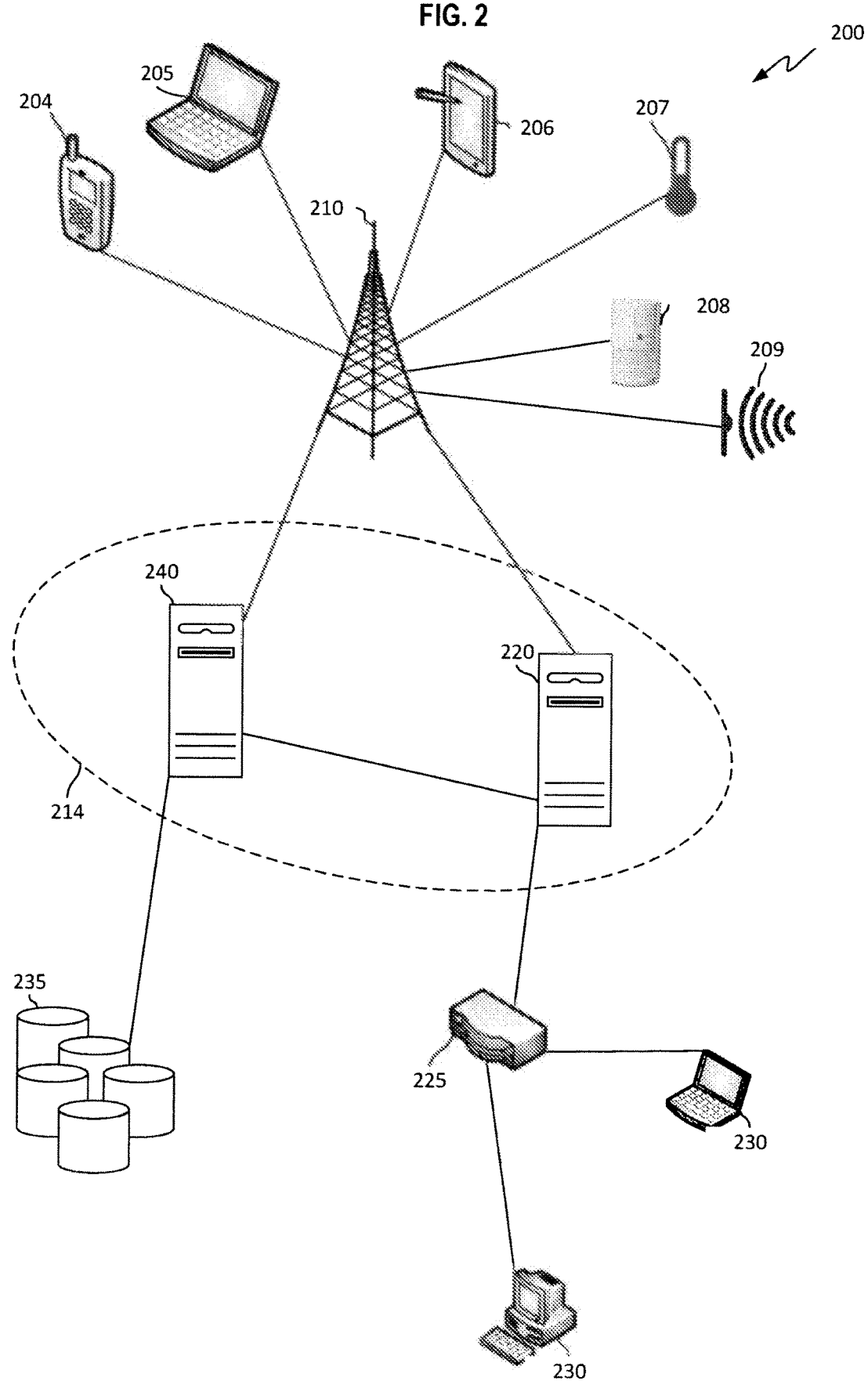
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like.

Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
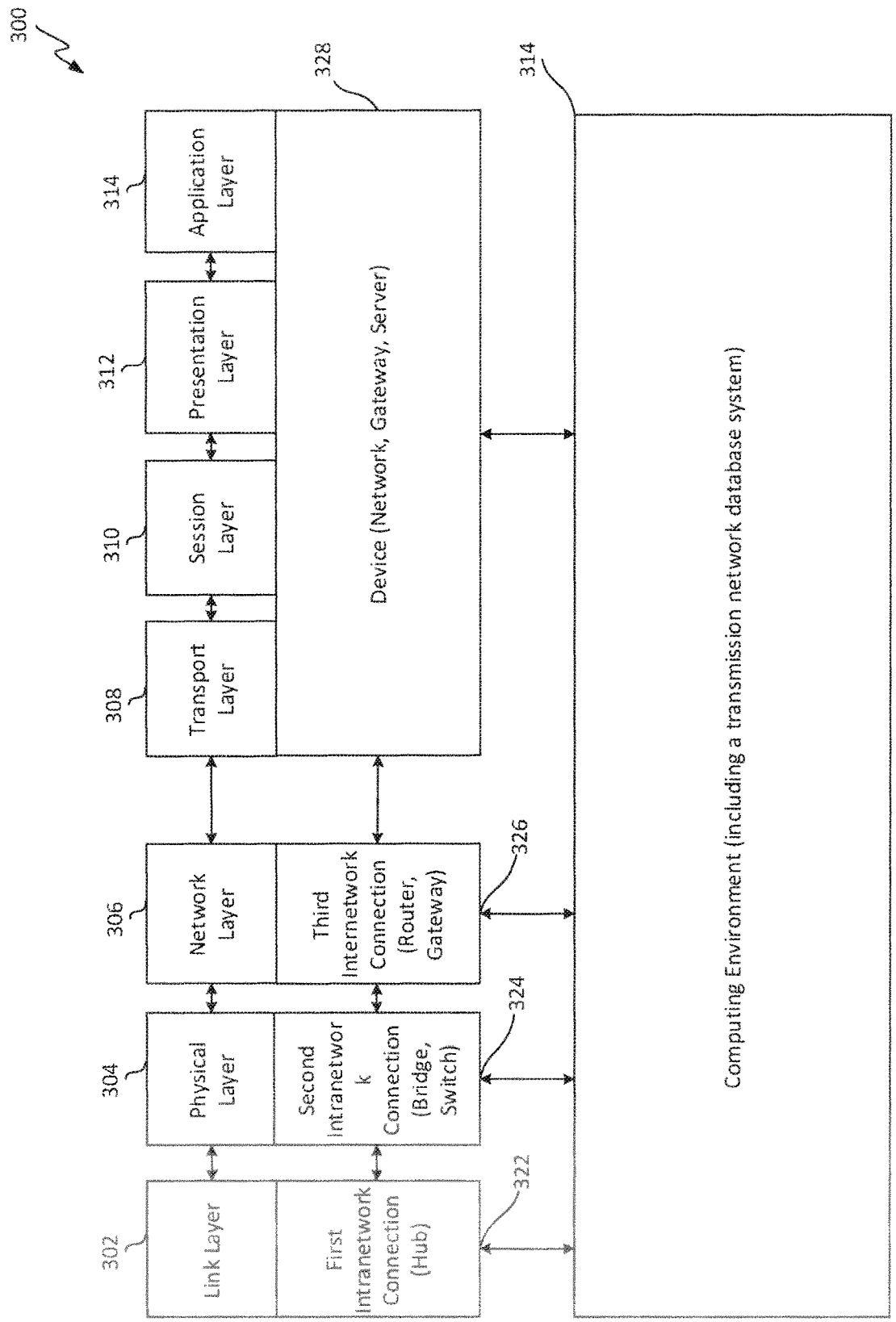
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is colocated by pre-distributing it to the grid nodes, and the analytic code on each node loads the local data into memory. Each node may be assigned a particular task such as a portion of a processing project, or to organize or control other nodes within the grid.

Figure 4:
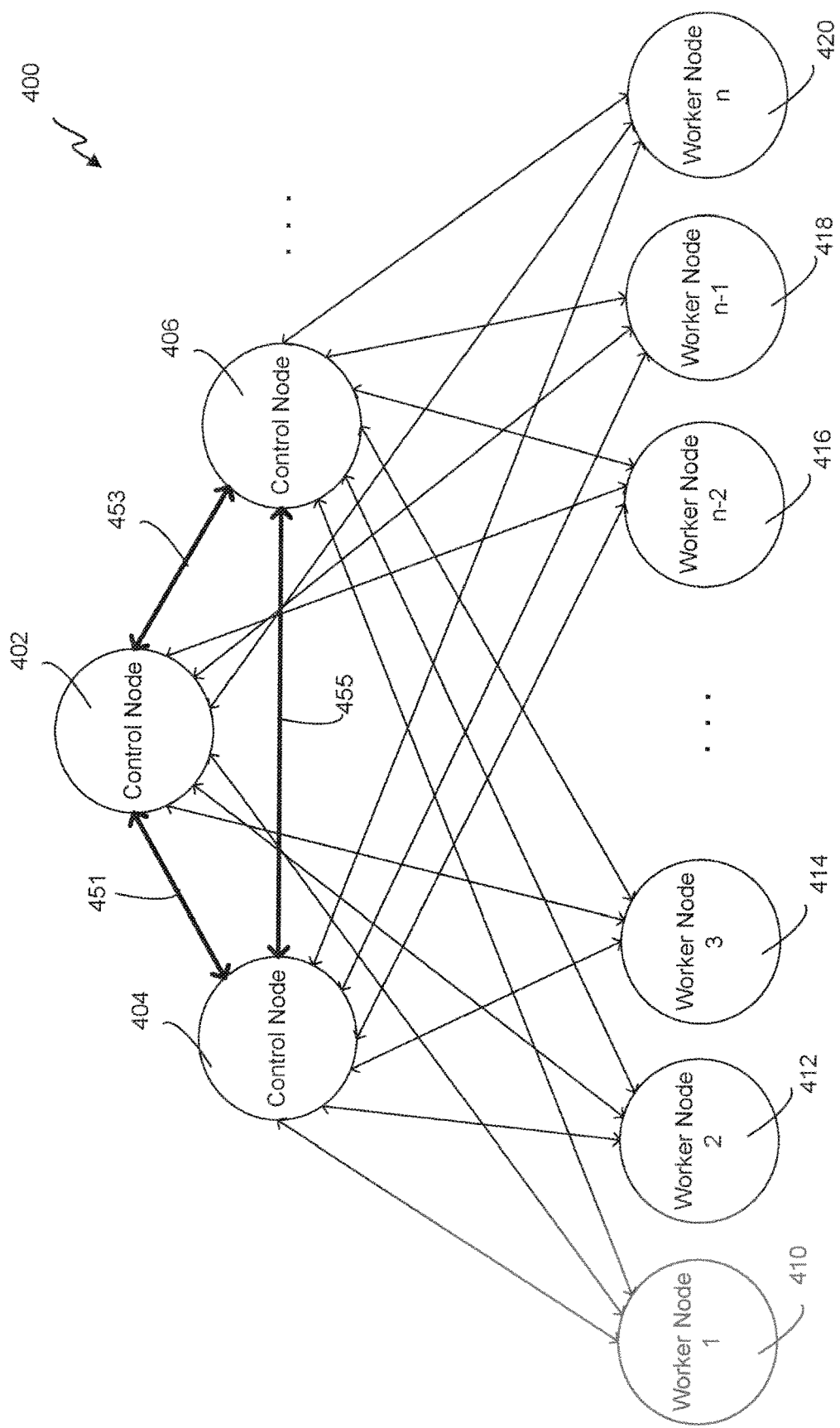
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node, other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
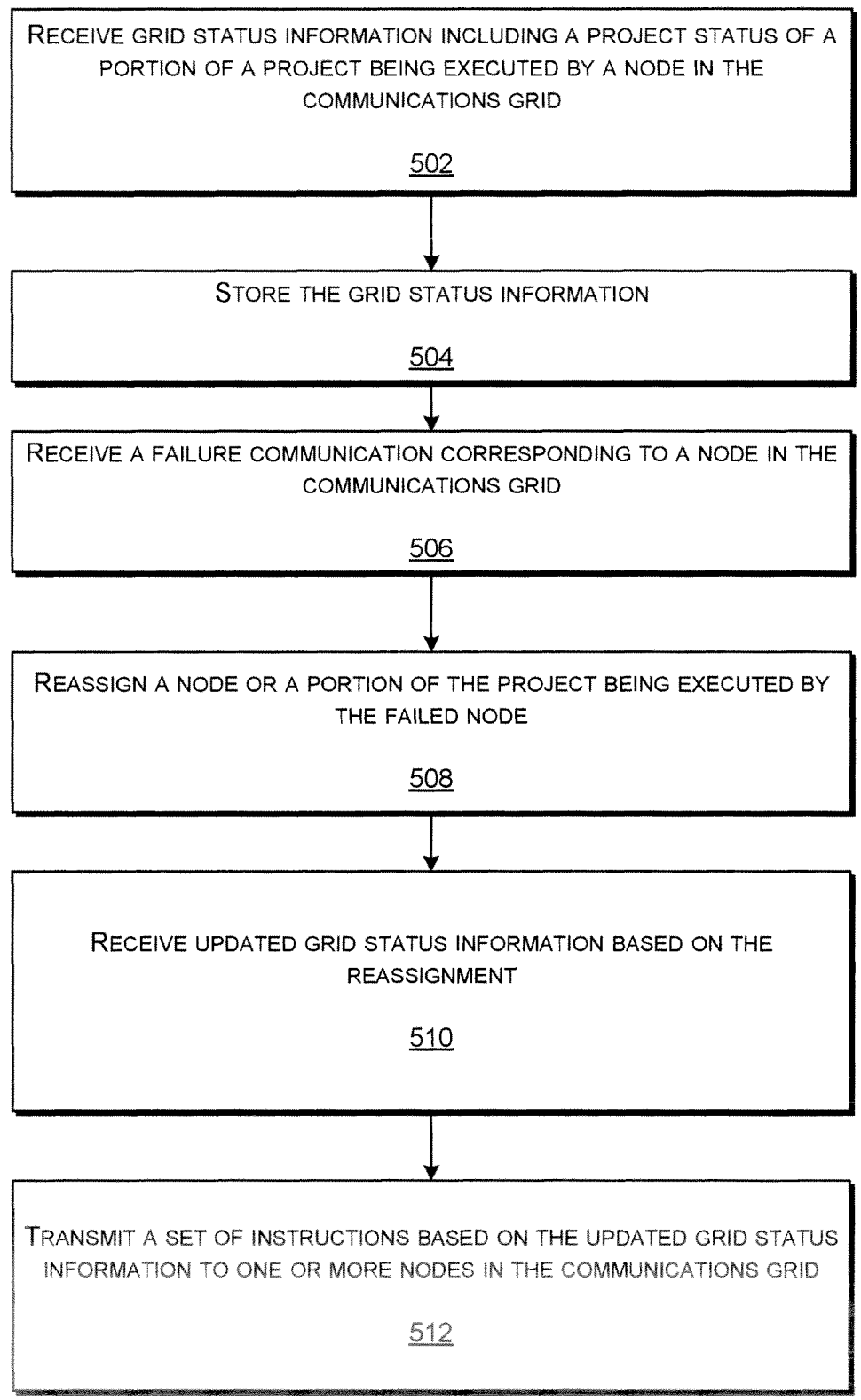
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512.

The updated grid status information may include an updated project status of the primary control node or an updated project status of the worker node. The updated information may be transmitted to the other nodes in the grid to update their stale stored information.

Figure 6:
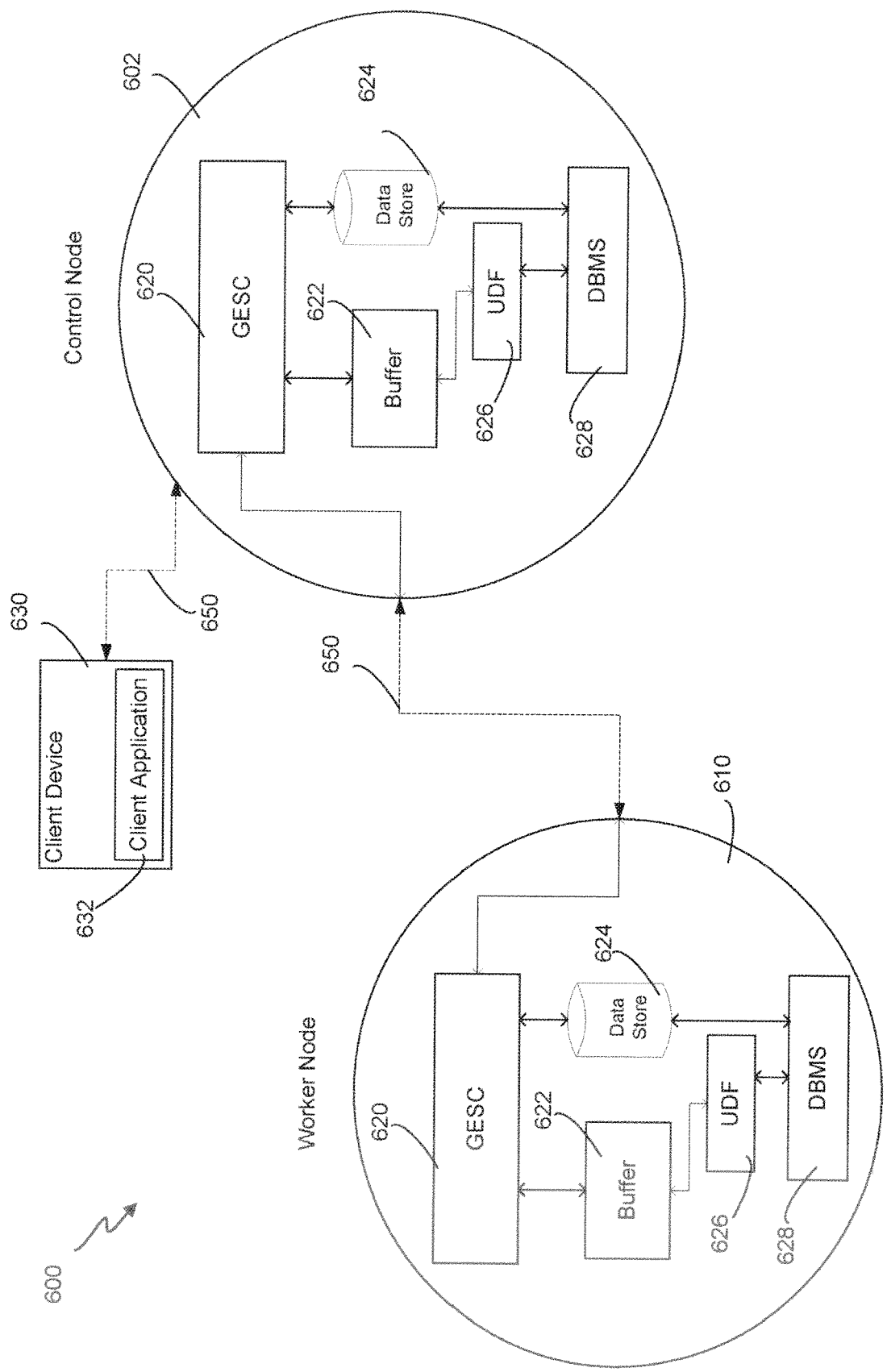
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a node 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
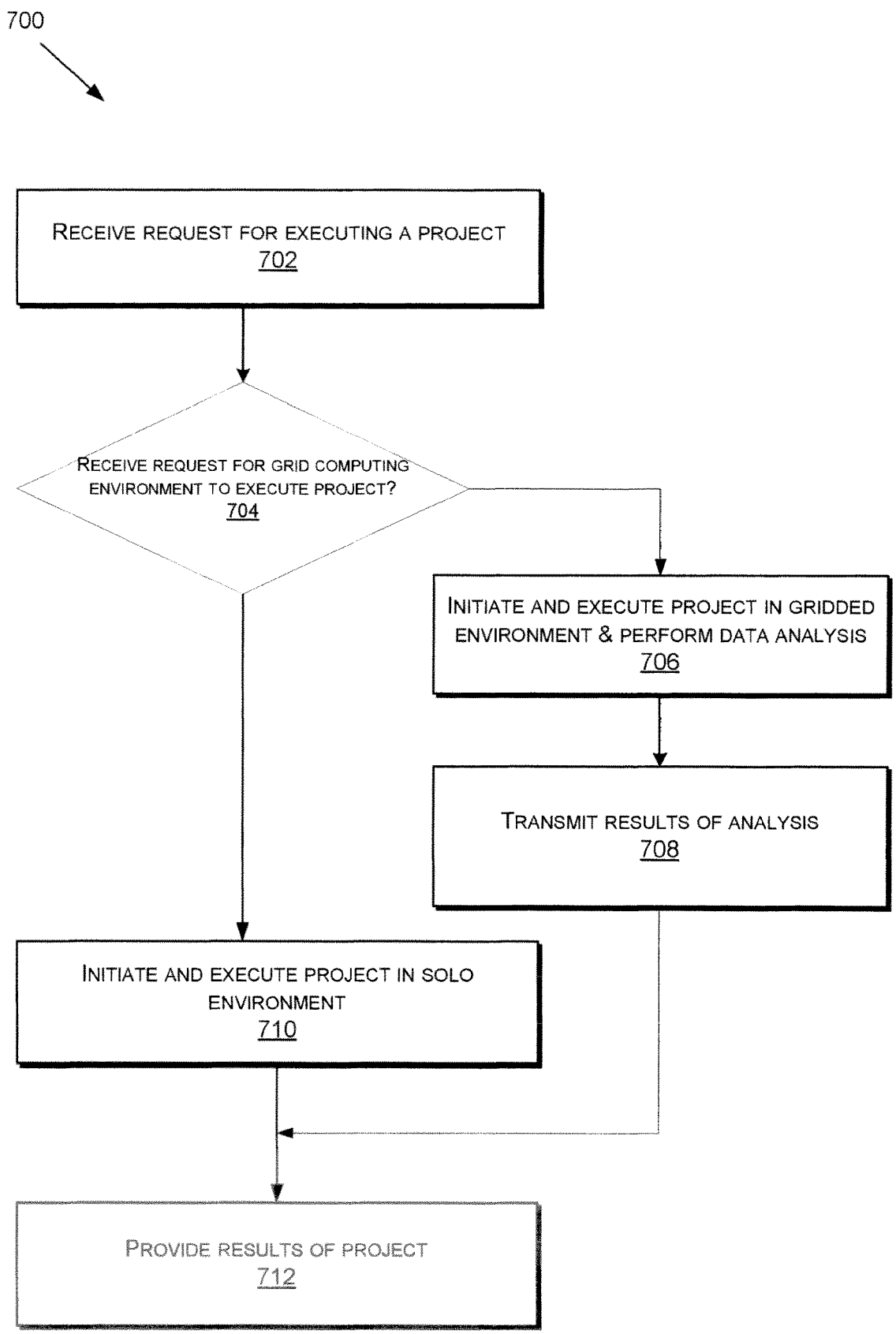
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may be generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
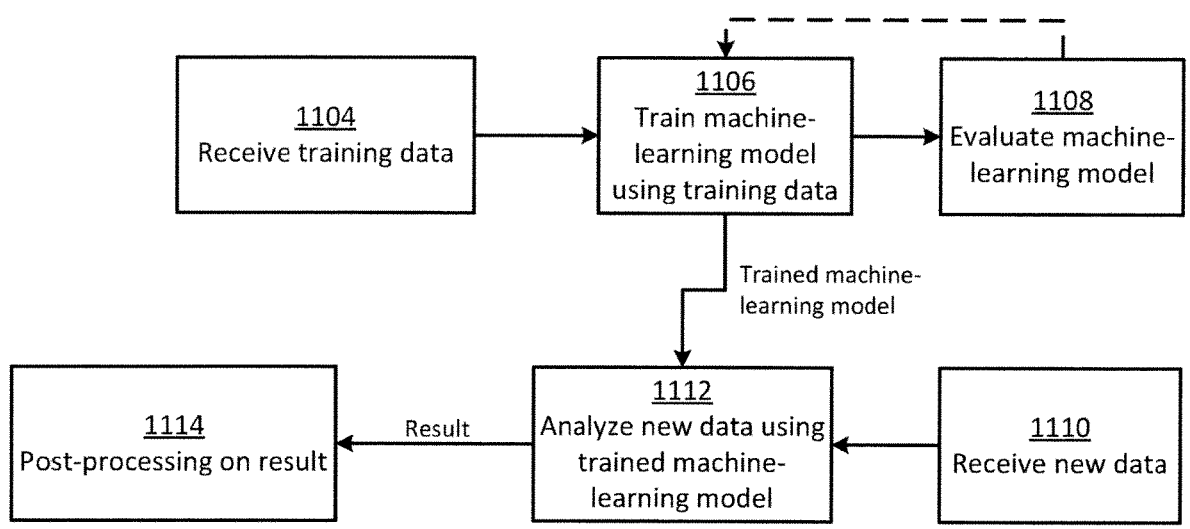
FIG. 11A illustrates a flow chart showing an example process for generating and using a machine-learning model, according to some embodiments of the present technology.

FIG. 11A is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11A.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 11B:
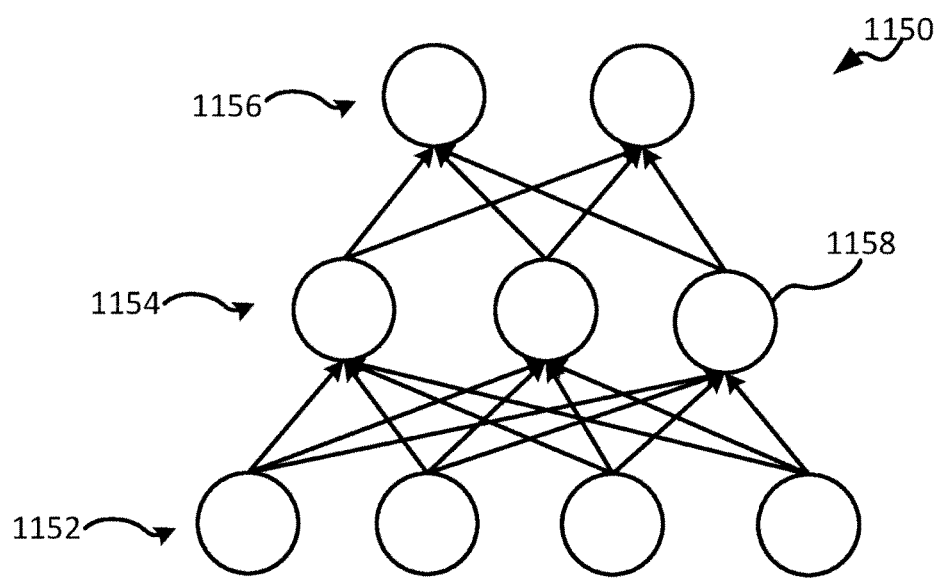
FIG. 11B illustrates a neural network including multiple layers of interconnected neurons, according to some embodiments of the present technology.

A more specific example of a machine-learning model is the neural network 1150 shown in FIG. 11B. The neural network 1150 is represented as multiple layers of interconnected neurons, such as neuron 1158, that can exchange data between one another. The layers include an input layer 1152 for receiving input data, a hidden layer 1154, and an output layer 1156 for providing a result. The hidden layer 1154 is referred to as hidden because it may not be directly observable or have its input directly accessible during the normal functioning of the neural network 1150. Although the neural network 1150 is shown as having a specific number of layers and neurons for exemplary purposes, the neural network 1150 can have any number and combination of layers, and each layer can have any number and combination of neurons.

The neurons and connections between the neurons can have numeric weights, which can be tuned during training. For example, training data can be provided to the input layer 1152 of the neural network 1150, and the neural network 1150 can use the training data to tune one or more numeric weights of the neural network 1150. In some examples, the neural network 1150 can be trained using backpropagation. Backpropagation can include determining a gradient of a particular numeric weight based on a difference between an actual output of the neural network 1150 and a desired output of the neural network 1150. Based on the gradient, one or more numeric weights of the neural network 1150 can be updated to reduce the difference, thereby increasing the accuracy of the neural network 1150. This process can be repeated multiple times to train the neural network 1150. For example, this process can be repeated hundreds or thousands of times to train the neural network 1150.

In some examples, the neural network 1150 is a feed-forward neural network. In a feed-forward neural network, every neuron only propagates an output value to a subsequent layer of the neural network 1150. For example, data may only move one direction (forward) from one neuron to the next neuron in a feed-forward neural network.

In other examples, the neural network 1150 is a recurrent neural network. A recurrent neural network can include one or more feedback loops, allowing data to propagate in both forward and backward through the neural network 1150. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1150 operates by receiving a vector of numbers from one layer; transforming the vector of numbers into a new vector of numbers using a matrix of numeric weights, a nonlinearity, or both; and providing the new vector of numbers to a subsequent layer of the neural network 1150. Each subsequent layer of the neural network 1150 can repeat this process until the neural network 1150 outputs a final result at the output layer 1156. For example, the neural network 1150 can receive a vector of numbers as an input at the input layer 1152. The neural network 1150 can multiply the vector of numbers by a matrix of numeric weights to determine a weighted vector. The matrix of numeric weights can be tuned during the training of the neural network 1150. The neural network 1150 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1154, of the neural network 1150. The subsequent layer of the neural network 1150 can receive the transformed output, multiply the transformed output by a matrix of numeric weights and a nonlinearity, and provide the result to yet another layer of the neural network 1150. This process continues until the neural network 1150 outputs a final result at the output layer 1156.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

According to embodiments discussed herein, the above-described computing devices and systems may be utilized to summarize data visualizations, also referred to as images (e.g., graph images). The summaries of data visualizations may be used to clearly communicate relevant parts of data visualizations in an efficient and effective manner, resulting in a computing device and/or system with exclusive and advantageous capabilities. For example, generating a textual summary of a data visualization may enable information contained in the data visualization to be communicated to a visually impaired person, such as via a braille terminal. In another example, a summary of a cardiogram may include natural-language text that indicates whether or not any patterns associated with an irregular heartbeat were detected in the cardio gram.

In some embodiments, the above-described computing devices and systems may implement a personalized graph summarizer to generate summaries of data visualizations. In various embodiments, the personalized graph summarizer may analyze a data visualization to detect predefined patterns within the data visualization, and produce a textual summary of the data visualization based on pre-defined patterns detected within the data visualization. In one or more embodiments, the personalized graph summarizer may be able to learn additional types of data visualizations and/or patterns to detect therein. For example, a personalized graph summarizer may learn to identify and summarize a spectrogram. In some embodiments, the personalized graph summarizer may be able to generate and/or tailor summaries of data visualizations based on user preferences. In some such embodiments, the personalized graph summarizer may learn user preferences based on interactions of the user with the personalized graph summarizer. For instance, the personalized graph summarizer may assign or alter priority levels associated with one or more sentences in a summary based on input received from a user.

In various embodiments, the personalized graph summarizer may include the ability to extract context from a data visualization. In various such embodiments, the personalized graph summarizer may use context extracted from a data visualization to improve clarity and readability of a natural-language textual summary for the data visualization. For example, extracted context may alter a sentence in a summary to read "A spike in dollar amount between Aug. 6, 2015 and Aug. 15, 2015." instead of "A spike in values." based on context extracted from the data visualization being summarized. These and other features of the personalized graph summarizer may enable a computing device and/or system implementing the personalized graph summarizer to realize unique and advantageous functionalities, resulting in an improved computer.

Figure 12A:
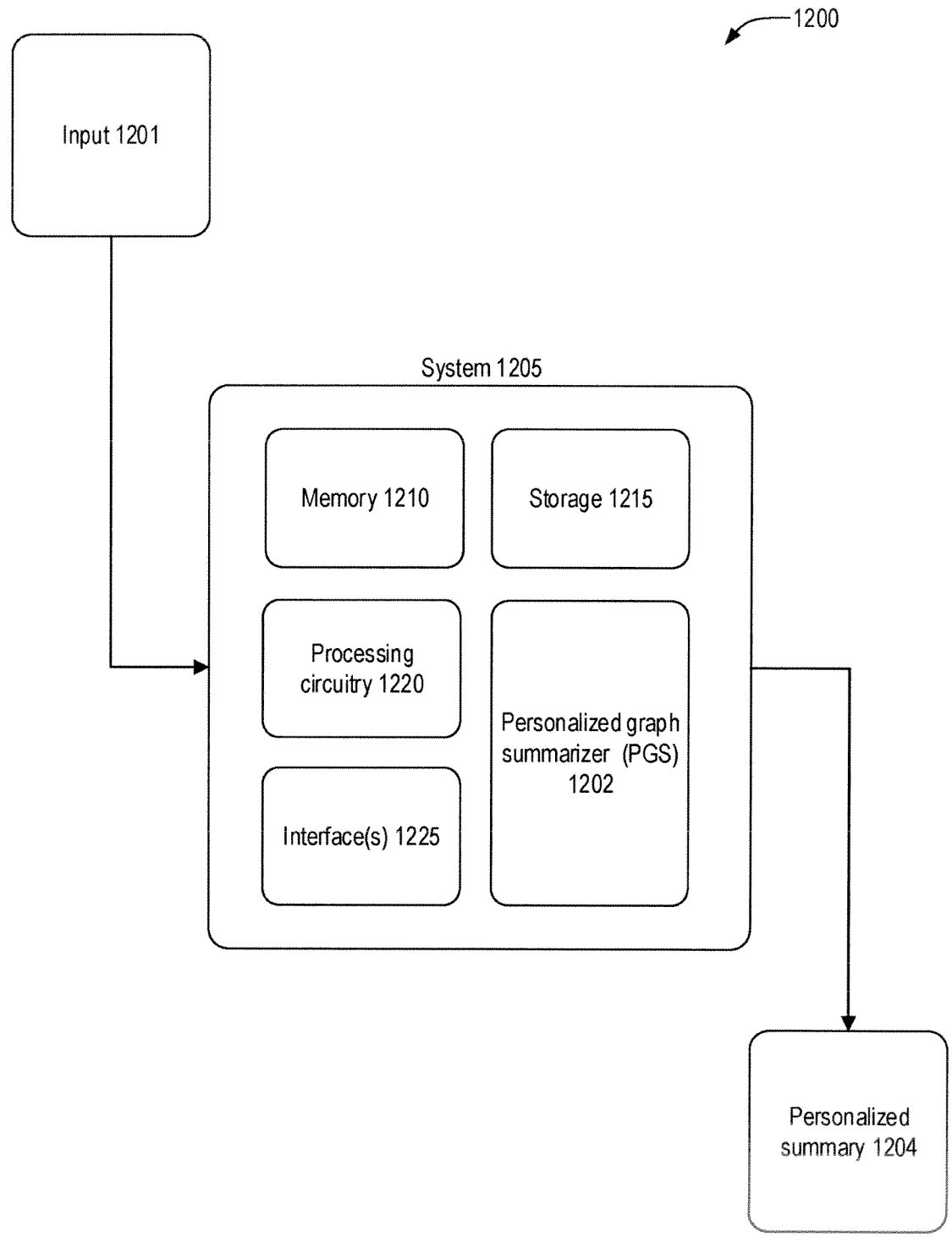
FIG. 12A illustrates an embodiment of an exemplary operating environment for a personalized graph summarizer.

FIG. 12A illustrates an example of an operating environment 1200 that may be representative of various embodiments. In operating environment 1200, system 1205 may receive or identify input 1201 and generate a personalized summary 1204 based on input 1201. For instance, system 1205 may receive an image file that includes a graph image as input 1201, analyze the graph image to detect one or more pre-defined patterns in the graph image, and generate personalized summary 1204 based on the one or more pre-defined patterns detected in the graph image. In some embodiments, these operations may be performed in real-time or near real-time by system 1205. Further, operating environment 1200 may include a number of systems, components, devices, and so forth to perform these operations; however, embodiments are not limited in this manner In some embodiments, operating environment 1200 may include more or less systems, components, and devices, for example. In various embodiments, operating environment 1200 may be implemented via one or more devices of FIG. 2. Embodiments are not limited in this context.

In the illustrated embodiments, system 1205 includes a number of components to generate personalized summary 1204 based on input 1201, including, but not limited to, personalized graph summarizer (PGS) 1202, memory 1210, storage 1215, processing circuitry 1220, and one or more interfaces 1225. In various embodiments, system 1205 may be coupled with one or more other systems, components, devices, networks and so forth, such as via interfaces 1225. In various such embodiments, the one or more other systems, components, devices, networks and so forth may perform one or more functions described herein. For instance, a server may perform one or more operations of PGS 1202.

Storage 1122 may be any type of storage, including, but not limited to, magnetic storage and optical storage, for example. In some instances, storage 1122 may be part of one or more of the storage systems 1130-1 through 1130-4 and may be a DAS, NAS, or SAN. The storage 1122 may store information and data for system 1205, such as information for processing by the by the system 1205. In embodiments, the storage 1122 may store information, data, one or more instructions, code, and so forth for PGS 1202.

The memory 1124 of system 1205 can be implemented using any machine-readable or computer-readable media capable of storing data, including both volatile and non-volatile memory. In some embodiments, the machine-readable or computer-readable medium may include a non-transitory medium. The embodiments are not limited in this context. The memory 1124 can store data momentarily, temporarily, or permanently. The memory 1124 stores instructions and data for system 1205, which may be processed by processing circuitry 1126. For example, the memory 1124 may also store temporary variables or other intermediate information while the processing circuitry 1126 is executing instructions. The memory 1124 is not limited to storing the above discussed data; the memory 1124 may store any type of data. In various embodiments, one or more portions of PGS 1202 may be stored in memory 1210 and/or storage 1215. In various such embodiments, PGS 1202 may reside in storage 1215 and/or memory 1210. In some embodiments, memory 1210 may include random access memory (RAM).

In embodiments, the system 1205 may include processing circuitry 1126 which may include one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processing circuitry, processor or processing circuit on a single chip or integrated circuit. The processing circuitry 1126 may be connected to and communicate with the other elements of the system 1205 including the modeling system 1210, the storage 1122, the memory 1124, and the one or more interfaces 1220. In one or more embodiments data associated with PGS 1202 may be moved from storage 1215 to memory 1210 to provide processing circuitry 1220 access thereto. For instance, processing circuitry 1220 may perform computations with and/or manipulate data associated with PGS 1202 that is stored in memory 1210.

The system 1205 may also include one or more interfaces 1220 which may enable the system to communicate over the network environment 135. In some embodiments, the interfaces 1220 can be a network interface, a universal serial bus interface (USB), a Firewire interface, a Small Computer System Interface (SCSI), a parallel port interface, a serial port interface, a network adapter, a radio, or any other device to enable the system 1205 to exchange information. In various embodiments, interfaces 1225 may include one or more input/output (I/O) devices, such as a display, a touch screen, a monitor, a keyboard, a mouse, a braille terminal, or any other devices capable of presenting data to a user or receiving data from a user. In various such embodiments, one or more I/O devices may be utilized to receive input 1201 or present personalized summary 1204.

In various embodiments described herein, PGS 1202 may enable system 1205 to provide a tool that enables users to automatically summarize data visualizations (i.e., images of data visualizations). In some embodiments, PGS 1202 may include one or more features to enable personalization of summaries. In some such embodiments, PGS 1202 may enable a user to create new personalized patterns to be searched for within input 1201 and/or tailor text of personalized summary 1204. In one or more embodiments, PGS 1202 may include a flexible environment that enables users to interact with it, such as via one or more of interfaces 1225. For instance, PGS 1202 may include a graphical user interface (GUI) presented on a display. In various such instances, the GUI 1201 may provide an interface through which one or more of input 1201 may be received or personalized summary 1204 may be provided to a user. Personalization may increase the applicability of PGS 1202, enabling a user to improve productivity though utilization of PGS 1202.

Figure 12B:
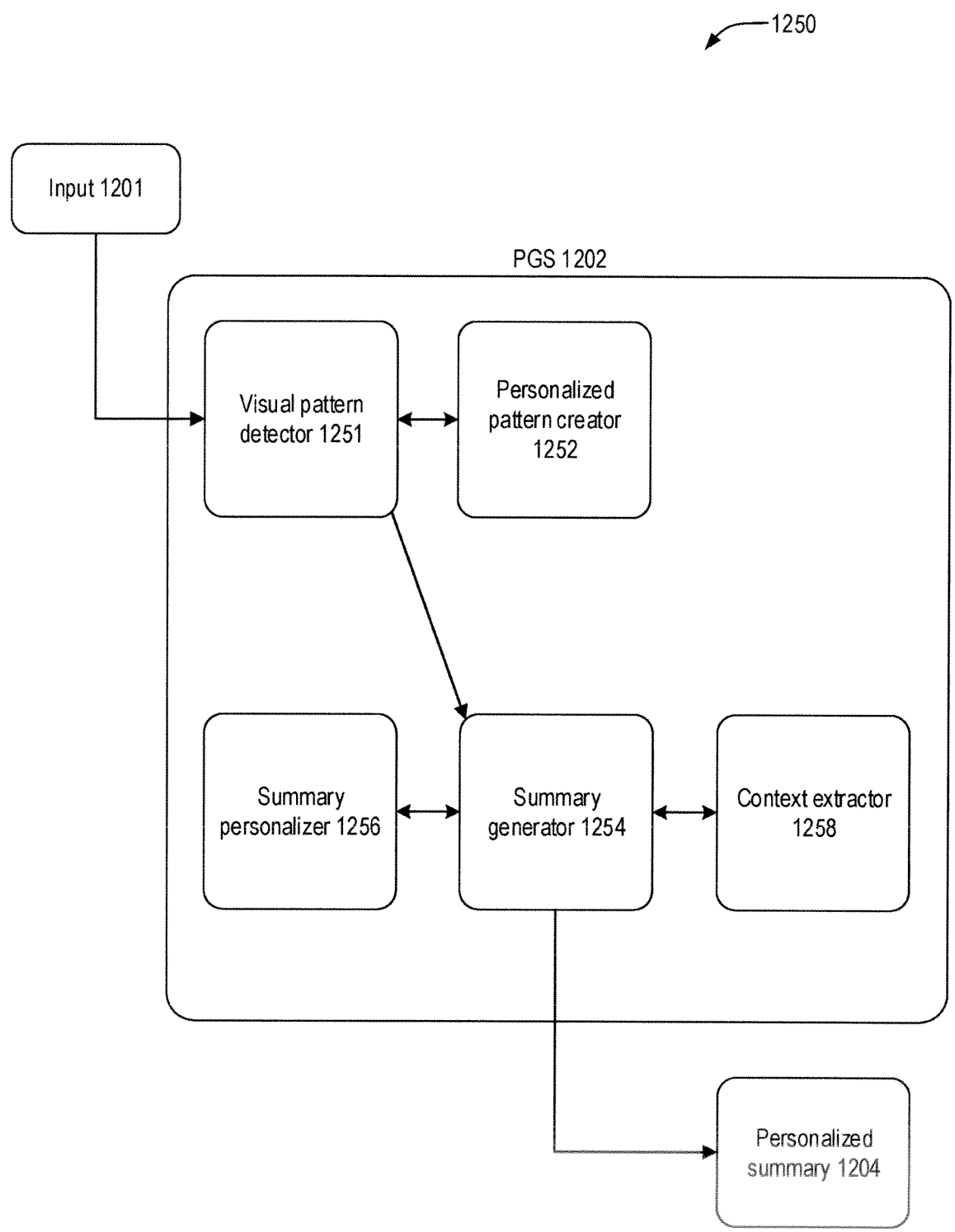
FIG. 12B illustrates an example processing flow of a personalized graph summarizer.

FIG. 12B illustrates an example of a processing flow 1250 of PGS 1202 that may be representative of various embodiments. In processing flow 1250, PGS 1202 may include visual pattern detector 1251, personalized pattern creator 1252, summary generator 1254, summary personalizer 1256, and context extractor 1258. In some embodiments, visual patter detector 1251 may analyze input 1201 by detecting pre-defined patterns. In various embodiments, personalized pattern creator 1252 may enable a user to create or modify one or more of the pre-defined patterns searched for by visual pattern detector 1251. In one or more embodiments, summary generator 1254 may generate and arrange one or more text templates based on identification of patterns. In some embodiments, context extractor 1258 may recover data from input 1201, such as via optical character recognition (OCR). In various embodiments, summary personalizer 1256 may learn preferences of a user. In one or more embodiments, summary personalizer 1256 may determine user preferences via revisions made to a summary by the user. Embodiments are not limited in this context.

As described above and as will be described in more detail below, such as with respect to FIGS. 13A-18, the components of PGS 1202 may operate to generate personalized summary 1204 based on input 1201. In embodiments, these operations may include one or more of the following.

In one or more embodiments, PGS 1202 may identify a data visualization comprising a graph image. In one or more such embodiments, the data visualization may include an image or image file. In various embodiments, PGS 1202 may determine a set of graph-type correlation scores for the graph images. In some embodiments, the set of graph-type correlation scores may include a graph-type correlation score for each graph type of a plurality of graph types. In various embodiments, each graph-type correlation score may be based on a comparison of at least a portion of the graph image with one or more graph-type models associated with each graph type of the plurality of graph types. In one or more embodiments, PGS 1202 may evaluate the set of graph-type correlation scores to identify a graph type of the graph image. In various embodiments PGS 1202 may retrieve a set of patterns based on the graph type of the graph image. In some embodiments, each pattern in the set of patterns may include one or more pattern examples.

In some embodiments, PGS 1202 may determine a set of region of interest (ROI) correlation scores for the graph image based on matching the one or more pattern examples of each pattern in the set of patterns with at least a portion of the graph image. In various embodiments, the set of ROI correlation scores may include at least one ROI correlation score for each pattern in the set of patterns. In embodiments, PGS 1202 may evaluate the set of ROI correlation scores to identify one or more candidate ROIs of the graph image. In one or more embodiments, each of the one or more candidate ROIs may include a portion of the graph image. In some embodiments, PGS 1202 may overlay the pattern example of the graph image in a plurality of positions to match a pattern example of a pattern in the set of patterns with at least a portion of the graph image. In some such embodiments, PGS 1202 may use a sliding window to match the pattern example of the pattern in the set of patterns with at least a portion of the graph image. In various embodiments, PGS 1202 may compute an ROI correlation score in the set of ROI correlation scores for each of the plurality of positions.

In one or more embodiments, PGS 1202 may retrieve a set of pattern models based on the set of candidate ROIs of the graph image. In some embodiments, each candidate ROI in the set of candidate ROIs may be associated with one pattern model in the set of patterns. In various embodiments, each pattern model in the set of pattern models may be associated with one pattern in the set of patterns. In some embodiments, PGS 1202 may compare each candidate ROI in the set of candidate ROIs to an associated pattern model in the set of pattern models to determine a set of pattern model correlation scores. In one or more embodiments, the set of pattern model correlation scores may include a pattern model correlation score for each candidate ROI of the one or more candidate ROIs. In some embodiments, each pattern model correlation score may indicate a likelihood of a respective candidate ROI of the one or more candidate ROIs including an associated pattern.

In various embodiments, PGS 1202 may identify one or more detected patterns based on the set of pattern model correlation scores. In various such embodiments, PGS 1202 may retrieve one or more text templates based on the one or more detected patterns. In some embodiments, the one or more text templates may include at least one portion of text associated with each detected pattern of the one or more detected patterns. In various embodiments, each text template of the one or more text templates may be associated with a priority level. In one or more embodiments, PGS 1202 may detect a portion of the graph image with contextual information. In one or more such embodiments, PGS 1202 may extract a textual element from the portion of the graph image with contextual information. In some embodiments, PGS 1202 may insert at least a portion of the contextual information into at least one text template of the one or more text templates to generate the textual description of the graph image. In various embodiments, PGS 1202 may identify a component of the graph image based on the graph type. In various such embodiments, PGS 1202 may determine contextual information is absent from the portion of the graph image with potential contextual information based on the component of the graph image identified based on the graph type. In one or more embodiments, PGS 1202 may detect a portion of the graph image with contextual information.

In some embodiments, PGS 1202 may arrange the one or more text templates in an order based on the priority level associated with each text template to generate a textual description of the graph image. In one or more embodiments, the summary of the graph image may include the graph image and the textual description of the graph image. In various embodiments, PGS 1202 may present the one or more text templates arranged based on the priority level associated with each text template via a user interface. In various such embodiments, PGS 1202 may arrange the one or more text templates in an updated order based on input received via the user interface. In some such embodiments, PGS 1202 may alter a priority level of at least one of the one or more text templates based on the updated order. In one or more embodiments PGS 1202 may alter the priority level of text template based on input received via a user interface. In some embodiments, PGS 1202 may generate the textual description based on the priority level associated with each text template. In various embodiments, the priority level of the at least one of the one or more text templates altered based on the updated order. In one or more embodiments, PGS 1202 may produce a summary of the graph image.

In various embodiments, PGS 1202 may receive an additional pattern example. In various such embodiments, PGS 1202 may update a pattern model in the set of pattern models based on the additional pattern example. In some embodiments, at least one pattern in the set of patters may comprise a personalized pattern. In one or more embodiments, PGS 1202 may create the personalized pattern based on one or more example graph images and one or more pattern examples identified in the example graph images based on input received via a user interface. In embodiments, PGS 1202 may associate one or more of a priority level, a text template, or a graph type with the personalized patter based on input received via the user interface. The embodiments are not limited in the context of these operations. It will be appreciated that these operations are not limiting, and different or additional operations maybe performed by PGS 1202 in generating personalized summary 1204 from input 1201 without departing from the scope of this disclosure.

FIGS. 13A-13H illustrate operations of that may be performed by the personalized pattern creator (PPC) 1252. In various embodiments, the operations may create a personalized pattern that PGS 1201 can identify and summarize. In various such embodiments, the operations may include one or more of pre-processing input, extracting features, updating one or more collections, training classifiers, or updating a pattern dictionary. For instance, example graph images, each comprising a common personalized pattern to be created or updated, may be received as input and pre-processed. In such instances, after pre-processing, features may be extracted from the example graph images. In some embodiments, the extracted features may include one or more mathematical representations of the example graph images. In one or more embodiments, the example graph images may then be used to update or create a new set of example graph images associated with the personalized pattern. In one or more such embodiments, a classifier may then be trained on the updated or new set of example graph images. In various embodiments, the classifier may then be used to update or create a pattern model in a pattern model dictionary. In various such embodiments, the pattern model may comprise the classifier. In some embodiments, once the updated or created pattern model is stored in the pattern model dictionary, PGS 1202 may be able to identify and summarize it. Embodiments are not limited in this context.

Figure 13A:
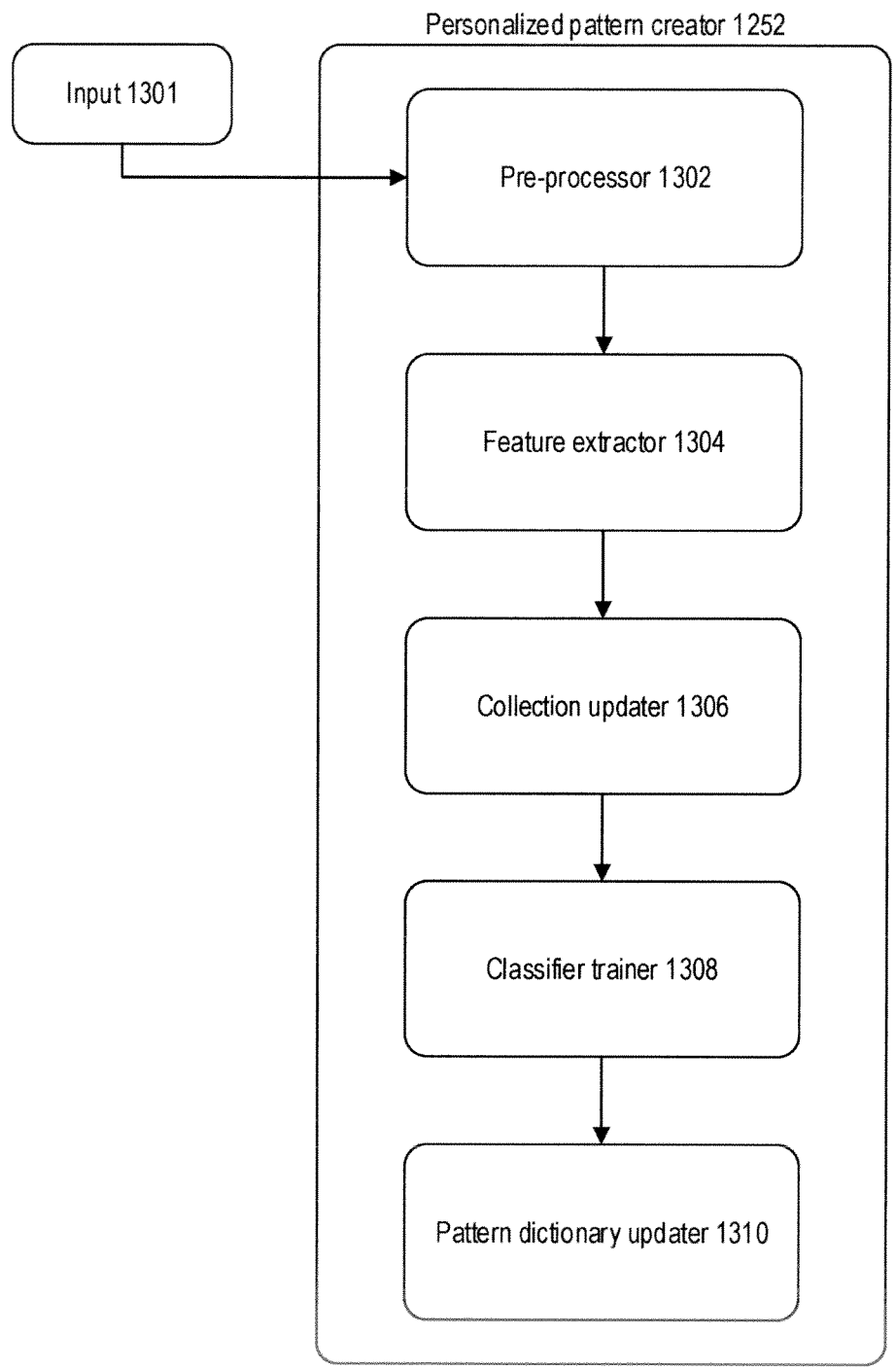
FIGS. 13A-13H illustrate an example processing flow of a personalized pattern creator.

Referring to FIG. 13A, PPC 1252 may identify or receive input 1301 for creating a personalized pattern to add to the pre-defined patterns that PGS 1202 may detect and summarize. In some embodiments, for instance, to create a personalized pattern, input 1301 may include one or more of example graph images, identification of ROIs, an insight message (e.g., "higher outlier (spike)"), a text template (e.g., A steading increase in data points with a higher outlier or spike"), a graph type (e.g., line chart), or a priority level (e.g., high). In some such embodiments, PPC 1252 may take this information and learn the personalized pattern and save it to a dictionary of pre-defined patterns or pattern models. In one or more embodiments, PPC 1252 may learn a pattern by generating a pattern model based on characteristics of the pattern examples. In one or more such embodiments, PPC 1252 may utilize a machine learning algorithm, such as in a Deep Neural Network (DNN), to learn a pattern. In various embodiments, the example images may also be used to improve graph type identification. For example, the additional graph-type examples provide more data to train a graph-type classifier, and the more data available for training can result in an improved classifier.

In various embodiments, PPC 1252 may include pre-processor 1302, feature extractor 1304, collection updater 1306, classifier trainer 1308, and pattern dictionary updater 1310. Generally, operation of PPC 1252 may proceed as follows. In one or more embodiments, pre-processor 1302 may generate one or more regions of interest (ROIs) associated with input 1301. In one or more such embodiments, the ROIs may be generated based on highlighted regions of images in input 1301. For instance, an ROI may include a spike in values highlighted in a graph image provided as input 1301. In some embodiments, pre-processor 1302 may pre-process input 1301. In some such embodiments, pre-processing may include one or more of denoising, resizing, or adjusting orientation of images. For example, images in input 1301 may be resized to a first standard size while ROIs are resized to a second standard size. In various embodiments, feature extractor 1304 may extract characteristic features associated with input 1301 (e.g., from the one or more ROIs). In various such embodiments, this may include one or more of raw pixels or a histogram of oriented gradients. In one or more embodiments, collection updater 1306 may update one or more of a graph-type examples collection or a pattern examples collection. For instance, images in input 1301 may be added to the graph-type examples collections and ROIs associated with input 1301 may be added to the pattern examples collection. In various embodiments, classifier trainer 1308 may generate one or more of a graph-type classifier or a pattern model classifier. In various such embodiments, the graph-type classifier and/or pattern model classifier may be generated based on one or more of feature characteristics, characteristics mapping, graph-type examples collection, or pattern examples collection. In some embodiments, pattern dictionary updater 1310 may update one or more of a graph-type models collection or a pattern models collection based on the classifiers generated by classifier trainer 1308. In one or more embodiments, the pattern models collection may include a pattern model for each pre-defined pattern that PGS 1202 may detect. In some embodiments, the pattern models collection may include a pattern model for one or more personalized patterns.

Figure 13B:
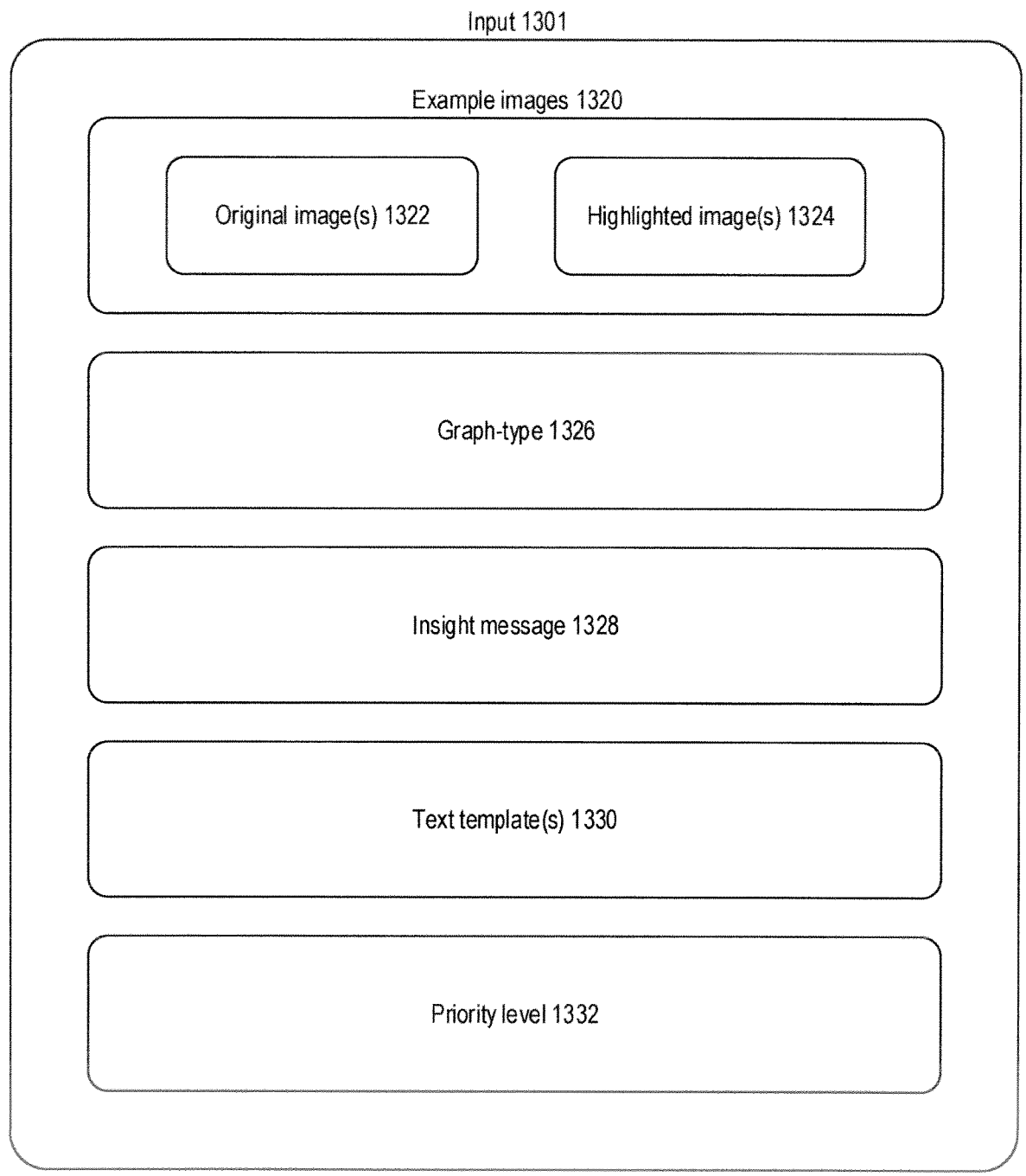
Figure 13C:
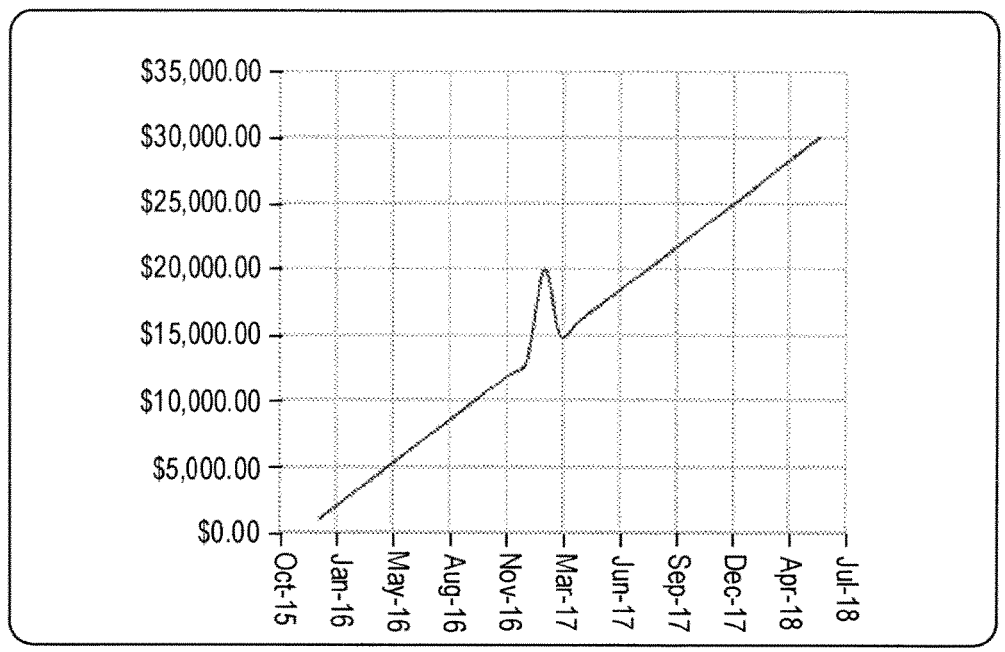
Figure 13C:
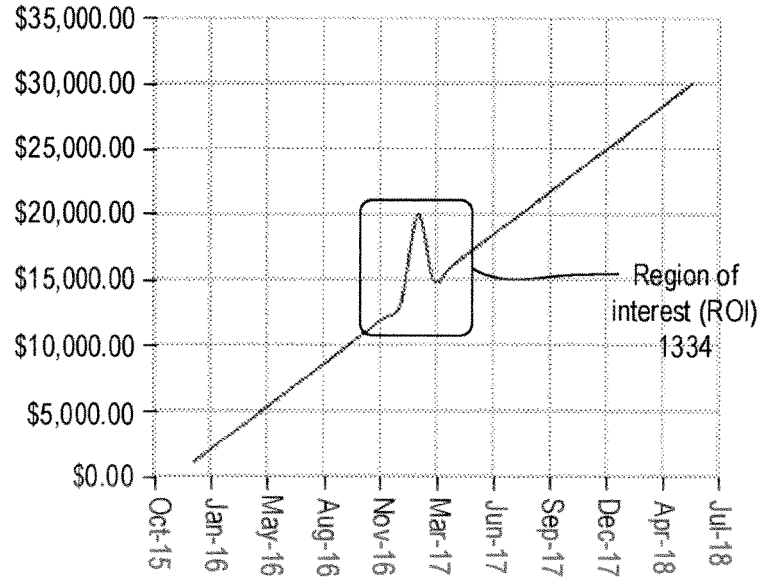

Referring to FIG. 13B, in some embodiments, input 1301 may include example images 1320, graph-type 1326, insight message 1328, text template(s) 1330, and priority level 1332. Further, example images 1320 may include one or more original images 1322 and one or more highlighted images 1324. In various embodiments described herein, original images 1322 may include a data visualization. As shown in FIG. 13C, original image 1322 may include a clean graph image while highlighted image 1324 includes the graph image with a bounding box around ROI 1334. It will be appreciated that a user may be prompted for one or more components of input 1301 at different times. For instance, PPC 1252 may provide an interface that allows a user to highlight ROI 1334 on original image 1322 to create highlighted image 1324. In some embodiments, input 1301 may include different or additional components.

Figure 13D:
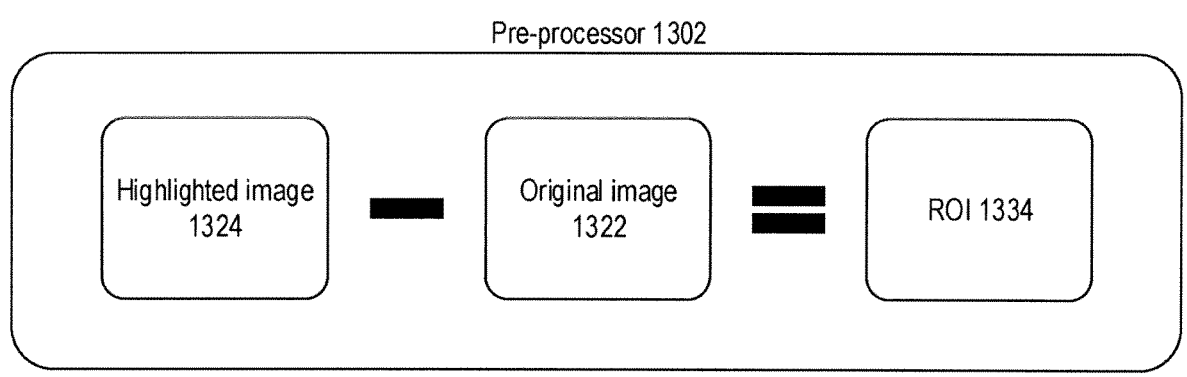

Referring to FIG. 13D, in various embodiments, pre-processor 1302 may generate one or more ROIs (e.g., ROI 1334) associated with input 1301. For instance, an ROI 1334 may include a spike in values of a graph image provided as input 1301 (see e.g., FIG. 13C). In various embodiments, pre-processor 1302 may extract ROI 1334 from highlighted image 1324. In some embodiments, ROI 1334 may be extracted from highlighted image 1324 by removing all portions of original image 1322 except ROI 1334. In embodiments that multiple ROIs are included in highlighted image 1324, pre-processor 1302 may extract each ROI as an independent object. In various embodiments, pre-processor 1302 may pre-process input 1301. In various such embodiments, pre-processing may include one or more of denoising, resizing, or adjusting orientation of images. In one or more embodiments, pre-processor 1302 may resize one of more of example images 1320 or ROI 1334 to one or more standard sizes. For example, original image(s) 1322 may be resized to a first standard size while ROIs (e.g., ROI 1334) are resized to a second standard size.

Figure 13E:
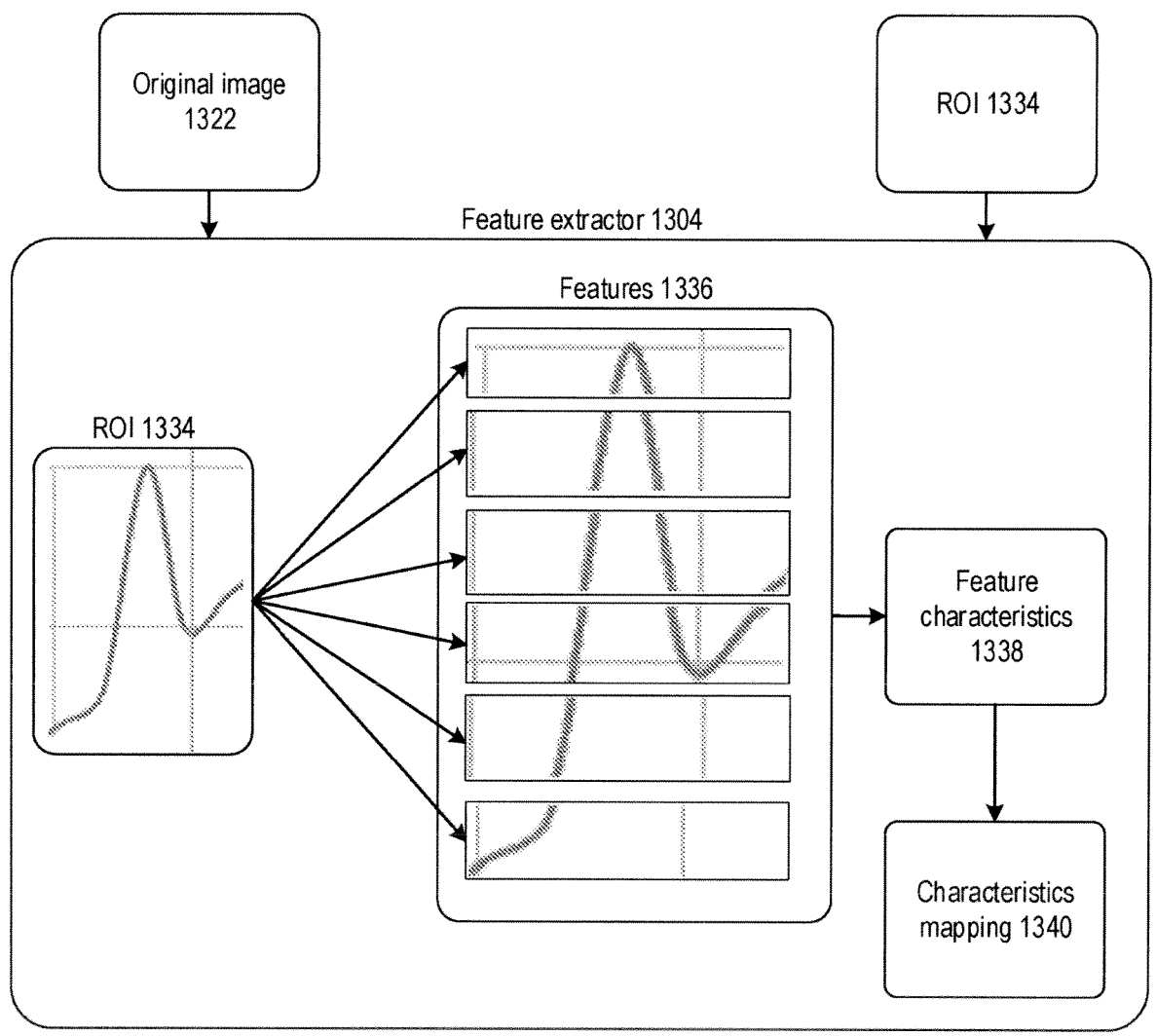

Moving now to FIG. 13E, in various embodiments, feature extractor 1304 may extract characteristic features associated with input 1301, such as from one or more of original image 1322 or ROI 1334. In various such embodiments, this may include one or more of raw pixels or a histogram of oriented gradients. In some embodiments, features may be mathematical representations of images. In one or more embodiments, these features may be used to describe characteristics of a pattern. In some embodiments, ROI 1334 may be broken down into features 1336. In some such embodiments, one or more of feature characteristics 1338 or characteristics mapping 1340 may be generated based on features 1336. In various embodiments, PGS 1202 may utilize any combination of feature sets having rotation and scale invariant descriptors (e.g., raw pixels). In various such embodiments, rotation and scale invariant features (e.g., densely sampled histogram of oriented gradients (HOG)) may enable PGS 1202 to handle rotated graphs as well as graphs at different scales.

Figure 13F:
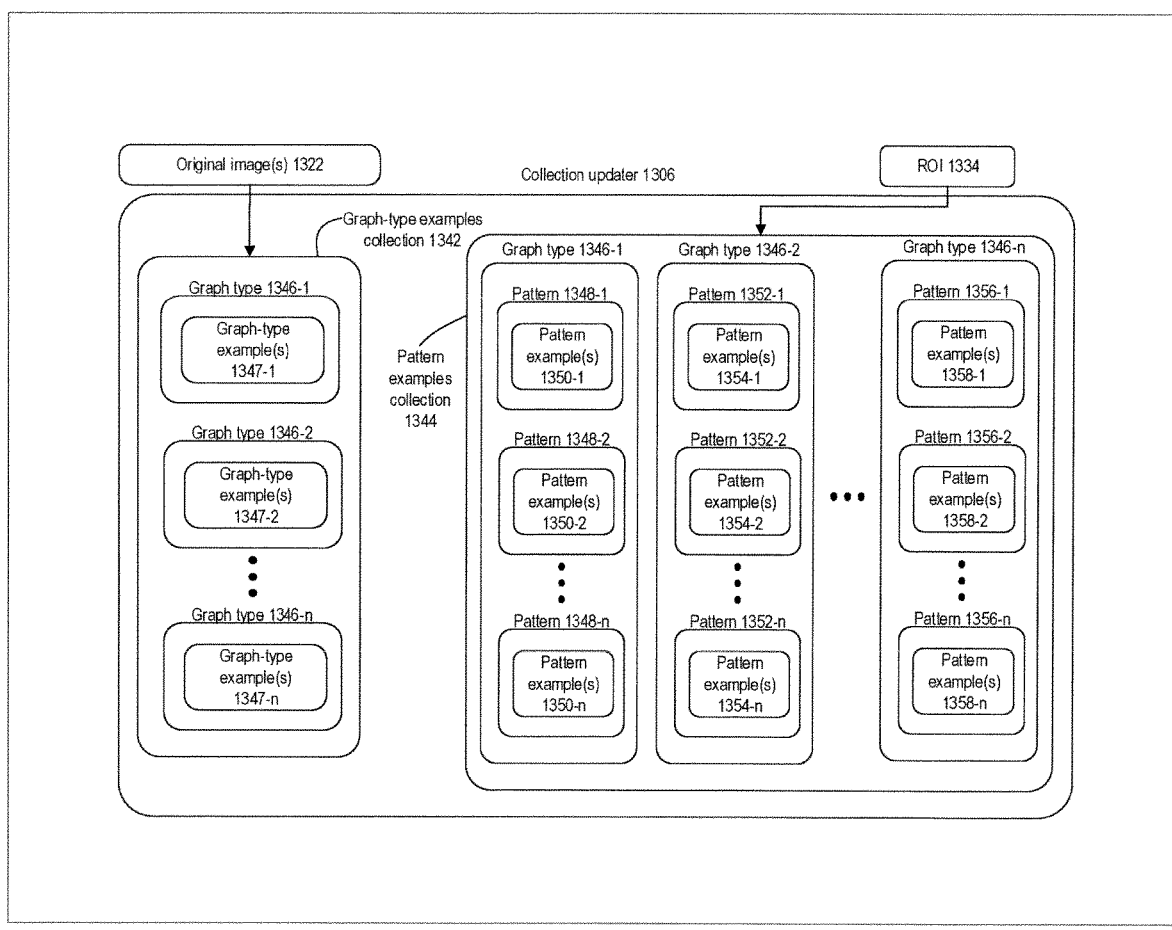

Referring now to FIG. 13F, collection updater 1306 may use original image(s) 1322 to create, update, and/or maintain graph-type examples collection 1342 and ROI 1334 to create, update, and/or maintain pattern examples collection 1344. In various embodiments, original image 1322 may be stored under a graph-type identified in input 1301 (e.g., graph-type 1326) as a graph-type example (e.g., graph-type example(s) 1347-1, 1347-2, 1347-*n*). In some embodiments, original image 1322 may cause a new graph type to be created in graph-type examples collection 1342. As shown in FIG. 13F, graph-type examples collection 1342 may include any number of graph types 1346-1, 1346-2, 1346-*n* under which original images 1322 may be stored as or added to as graph type examples (e.g., graph-type example(s) 1347-1, 1347-2, 1347-*n*). Further, each graph-type may include any number of graph type examples.

Similarly, pattern examples collection 1344 may be stored in pattern examples collection 1344 as a pattern example in a set of one or more pattern examples (e.g., pattern example(s) 1350-1, 1350-2, 1350-*n*, 1354-1, 1354-2, 1354-*n*, 1356-1, 1356-2, 1356-*n*). In one or more embodiments, ROI 1334 is stored in a set of pattern examples under one or more classifications or associations. For instance, each set of pattern examples may be associated with a specific pattern (e.g., pattern 1348-1, 1348-2, 1348-*n*, 1352-1, 1352-2, 1352-*n*, 1356-1, 1356-2, or 1356-*n*) and a specific graph type (e.g., graph type 1346-1, 1346-2, or 1346-*n*). In various embodiments, collection updater 1306 create one or more of a new graph type, pattern, or pattern example to accommodate ROI 1334 in pattern examples collection 1344.

Figure 13G:
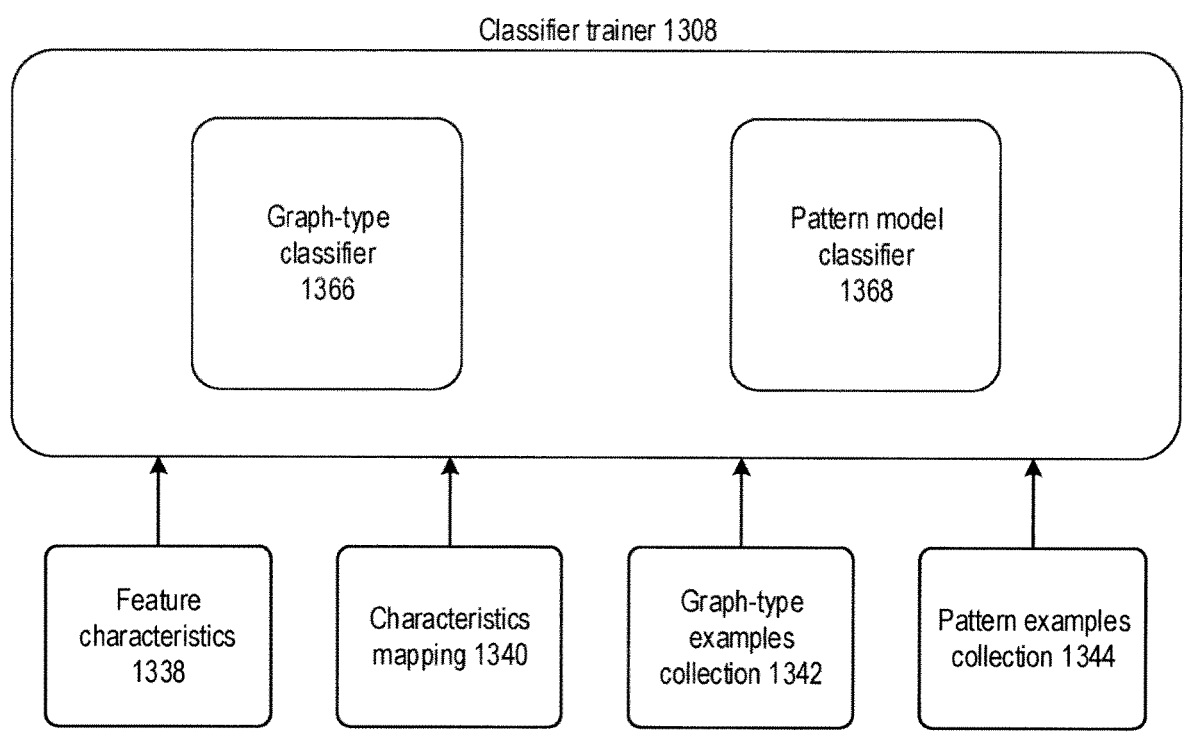

In FIG. 13G, classifier trainer 1308 may use one or more of feature characteristics 1338, characteristics mapping 1340, graph-type examples collection 1342, or pattern examples collection generate or train one or more of graph-type classifier 1366 or a pattern model classifier 1368. In various such embodiments, the graph-type classifier 1366 and/or pattern model classifier 1368 may be generated based on one or more of feature characteristics, characteristics mapping, graph-type examples collection, or pattern examples collection. In some embodiments, graph-type classifier 1366 may be generated based on or trained with one or more example images (e.g., graph-type examples 1347-1, 1347-2, 1347-*n*) received during operation of PPC 1252 and/or a pre-existing collection of graph type images. For instance, PGS 1202 may come preloaded with the pre-existing collection of graph type images. In various embodiments, pattern model classifiers 1368 may be generated in a similar manner to that of graph-type classifier 1366, except based on different example images (e.g., pattern examples 1350-1 through 1358-*n*).

In one or more embodiments, classifier trainer 1308 may utilize machine learning algorithms to generate or train one or more of graph-type classifier 1366 and pattern model classifier 1368. For example, a machine learning algorithm may take pattern examples associated with a specific pattern (e.g., pattern examples 1350-1 of pattern 1348-1) as input and generate a corresponding pattern model classifier as output. In one or more such embodiments, these machine learning algorithms may utilize one or more of a Support Vector Machine (SVM), a Deep Neural Network (DNN), Random Forest Trees, Naïve Baes, Boosting, and other machine learning algorithms or techniques. In various embodiments, PGS 1202 may initially support a set of initial graph types, such as linear graphs and bar graphs. However, in some embodiments, the flexible and modular design of PGS 1202 may support learning further graph types. Further, in one or more embodiments, updating graph-type examples collection 1342 and pattern examples collection 1344 with additional examples may improve the accuracy of the generated classifiers (e.g., graph-type classifier 1366 and/or pattern model classifier 1368) by enabling a larger training set to be input to the machine learning algorithm that generates the classifiers.

Figure 13H:
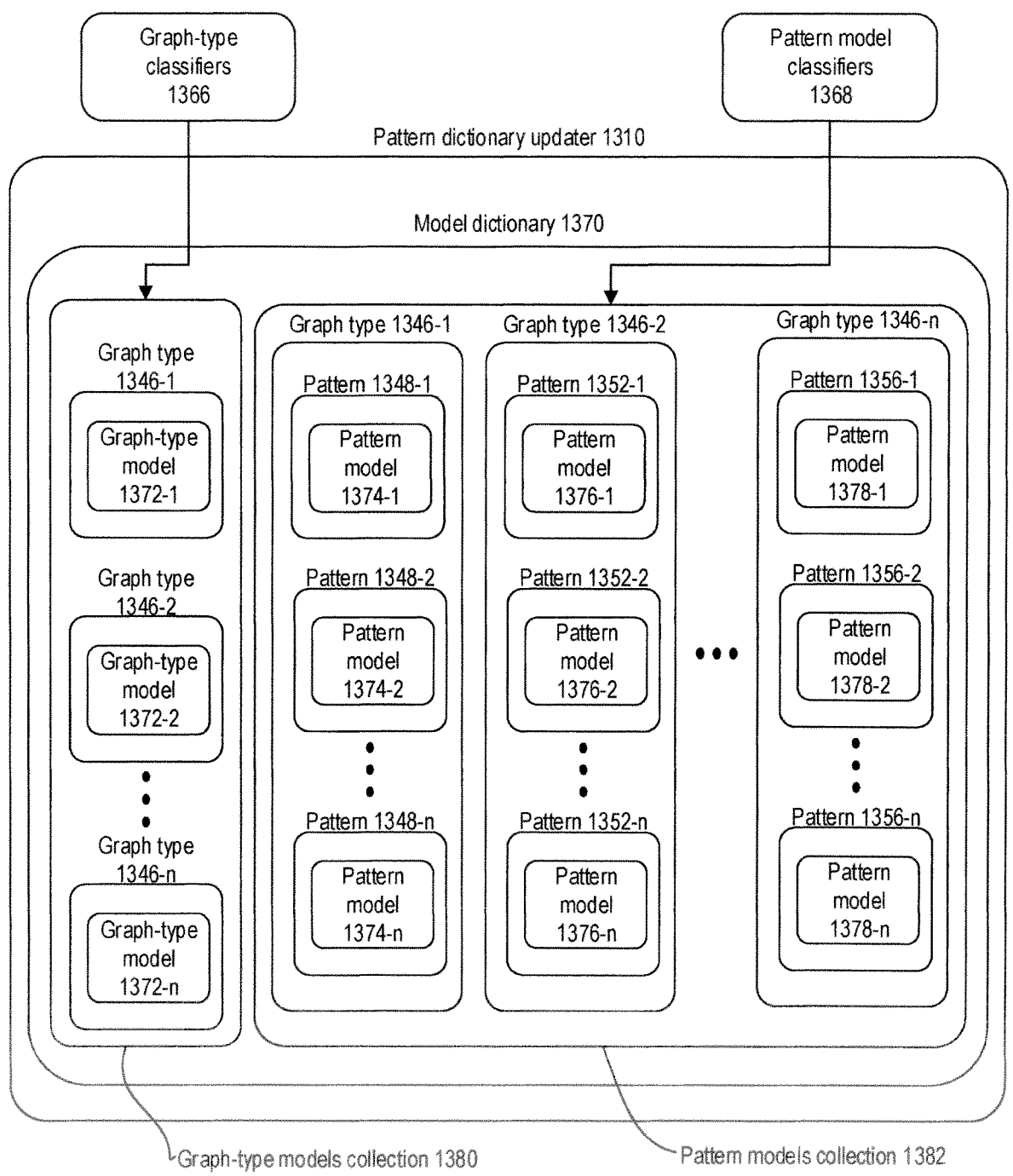

Moving to FIG. 13H, in some embodiments, pattern dictionary updater 1310 may create, update, and/or maintain one or more portions of a model dictionary 1370. In various embodiments, model dictionary 1370 may include one or more of a graph-type models collection 1380 or a pattern models collection 1382 that are created, updated, and/or maintained based on the classifiers generated by classifier trainer 1308. In some embodiments, a graph-type model may comprise an associated graph-type classifier. For instance, graph-type model 1372-1 for graph type 1346-1 may include a graph-type classifier trained on graph-type examples 1347-1. Similarly, in various embodiments, a pattern model may comprise an associated pattern model classifier. For example, pattern model 1376-1 for pattern 1352-1 may include a pattern model classifier trained on pattern examples 1354-1. In one or more embodiments, the pattern models collection 1382 may include a pattern model for one or more of the pre-defined patterns that PGS 1202 may detect (e.g., pattern 1348-1, 1348-2, 1348-*n*, 1352-1, 1352-2, 1352-*n*, 1356-1, 1356-2, 1356-*n*). In some embodiments, the patterns may be grouped by graph type (e.g., graph type 1346-1, 1346-2, 1346-*n*). In various embodiments, the graph-type models collection 1380 may include a graph-type model (e.g., graph-type model 1372-1, 1372-2, 1372-*n*) for each graph type that PGS 1202 can identify. In one or more embodiments, the models may be used to generate a numerical likelihood that an associated pattern or graph-type is present in an image provided to PGS 1202 for generation of a personalized summary (e.g., personalized summary 1204).

Figure 14A:
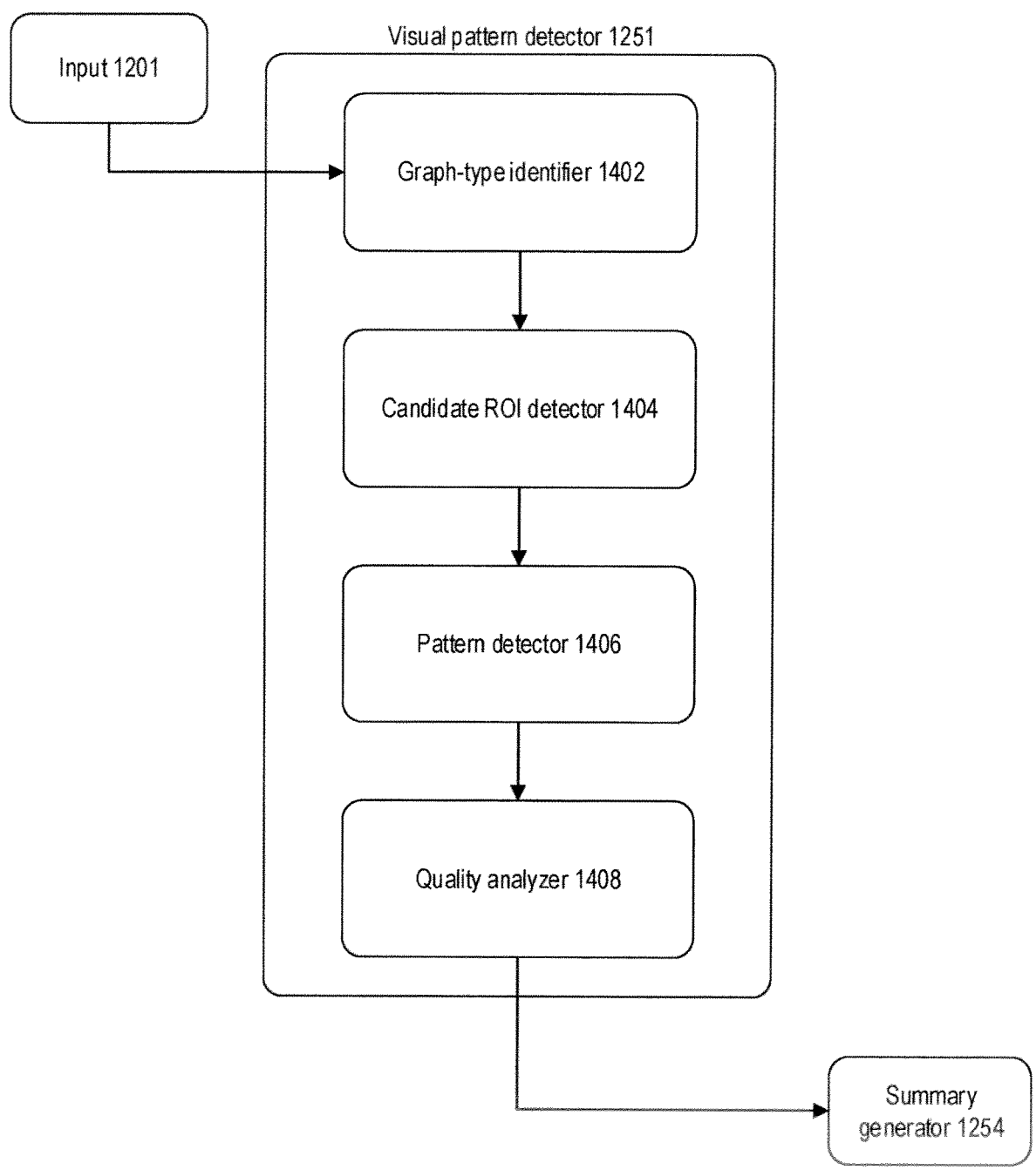
FIGS. 14A-14G illustrates an example processing flow of a visual pattern detector.
Figure 14B:
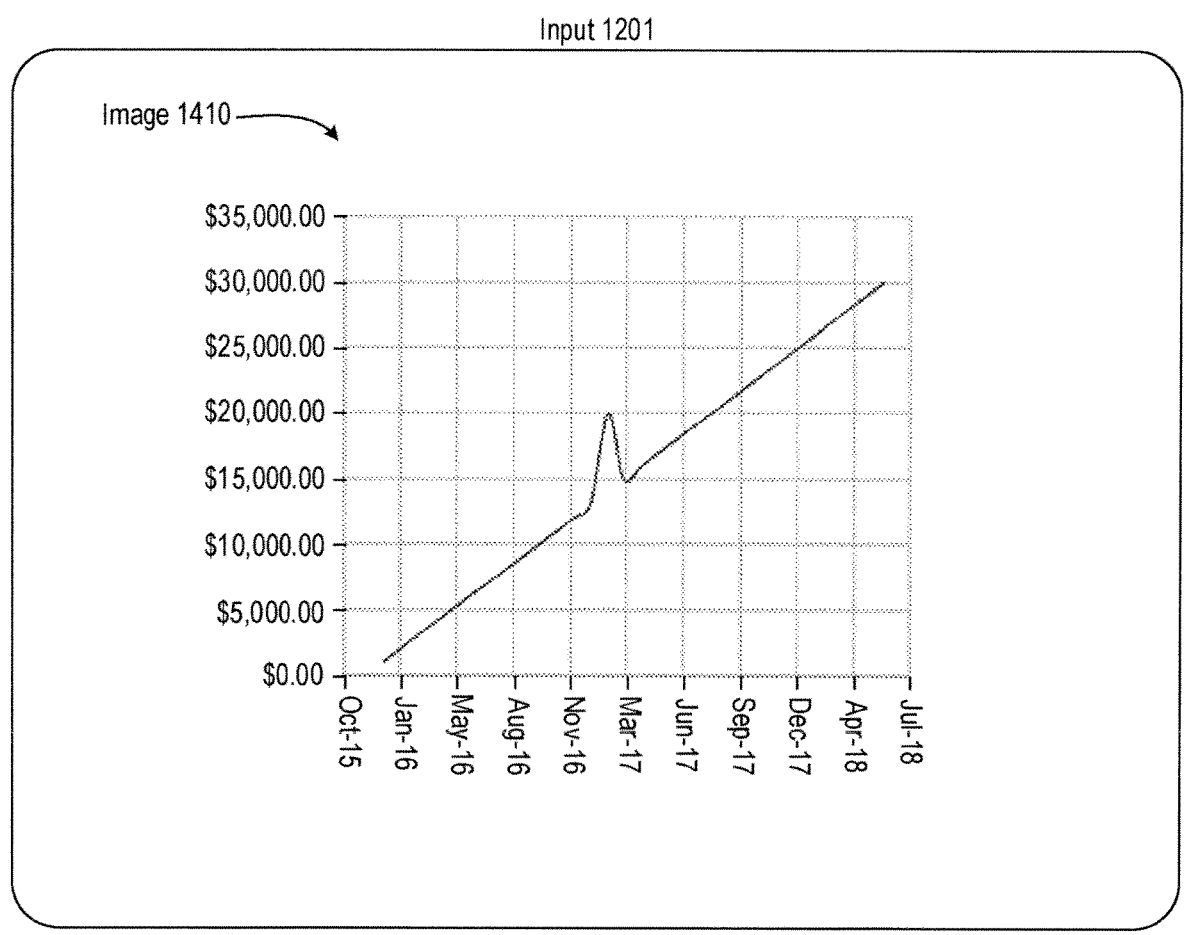

FIGS. 14A-14G illustrate operations of that may be performed by the visual pattern detector (VPD) 1251. In various embodiments, the operations may include of one or more of graph-type identification, candidate ROI detection, pattern detections, and quality analysis. Referring to FIG. 14A, VPD 1251 may identify or receive input 1201 to search for one or more patterns to enable generation of personalized summary 1204. In some embodiments, such as the embodiment of FIG. 14B, input 1201 may include an image 1410 (i.e., data visualization) that VPD 1251 searches for one or more pre-defined patterns. In the illustrated embodiments, image 1410 includes a graph image. Embodiments are not limited in this context.

In one or more embodiments described herein, the detection of patterns in image 1410 by VPD 1251 may proceed as follows. Classify the graph type in image 1410 based on one or more graph-type models in graph-type models collection 1380 (e.g., graph-type models 1372-1, 1372-2, 1372-*n*). Retrieve a list of patterns for the graph type of the image 1410. For instance, if the graph type of image 1410 is identified as graph type 1346-1, the list of patterns may include patterns 1348-1, 1348-2, 1348-*n*. For each pattern associated with the identified graph type of image 1410, the associated set of pattern example(s) may be retrieved from pattern examples collection 1344 and for each pattern example, a determined number of ROIs in image 1410 that have high correlations with a respective pattern example may be selected. For instance, the five ROIs in image 1410 that correlate with each respective pattern example the closest may be example may be selected. For each pattern example, the selected ROIs may then be run against the pattern model associated with the same pattern as the pattern examples to determine a likelihood of detecting a respective pattern in each of the respective selected ROIs. Finally, the likelihoods are evaluated to identify one or more detected patters. In various embodiments, the detected patterns may be passed to summary generator 1254 for generation of personalized summary 1204 based on the detected patterns.

Figure 14C:
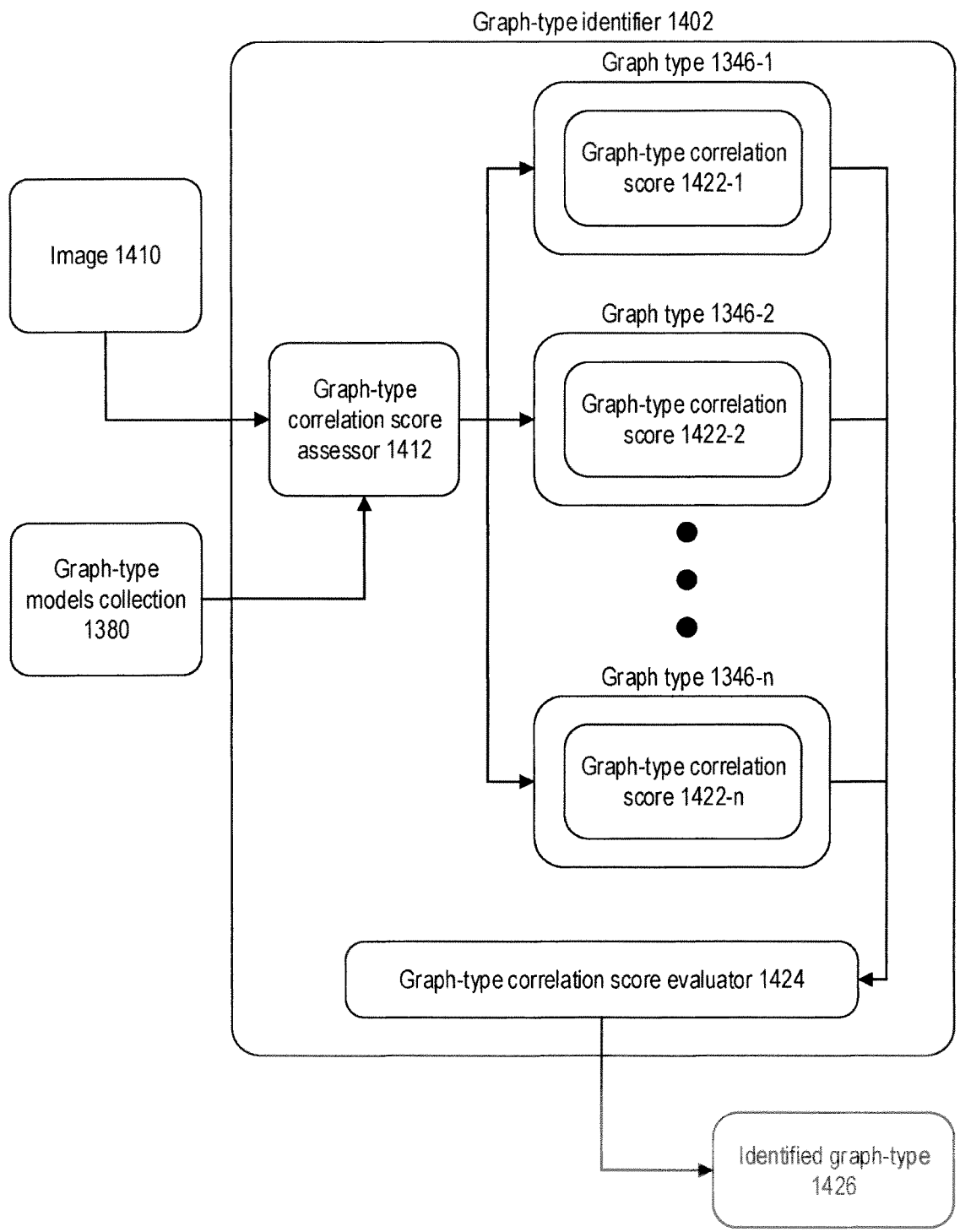

Referring to FIG. 14C, graph-type identifier 1402 may be responsible for identifying and/or associating a graph-type with image 1410. In one or more embodiments, associating a graph-type with image 1410 may enable one or more patterns specific to that graph type to be retrieved, such as from one or more of model dictionary 1370, graph-type examples collection 1342, or pattern examples collection 1344. In various embodiments, graph type identifier may include a graph-type correlation score assessor (GTCSA) 1412. In some embodiments, GTCSA 1412 may compute a graph-type correlation score for one or more of graph types 1346-1, 1346-2, 1346-*n* (e.g., graph-type correlation scores 1422-1, 1422-2, 1422-*n*) based on image 1410. In various embodiments, GTCSA 1412 may utilize one or more graph-type classifiers generated by classifier trainer 1308 (e.g., graph-type classifier 1366) to compute the graph-type correlation scores. For instance, GTCSA 1412 may run image 1410 against each graph-type model in graph-type models collection 1412 to generate a graph-type correlation score associated with image 1410 for each respective graph type. In such instances, a graph-type classifier trained on examples of a respective graph type may be used to generate the graph-type correlation score for the respective graph type. In one or more embodiments, graph-type identifier 1402 may include a graph-type correlation score evaluator (GTCSE) 1424. In one or more such embodiments, GTCSE 1424 may associate image 1410 with an identified graph-type 1426 based on a comparison of the graph-type correlation scores.

Figure 14D:
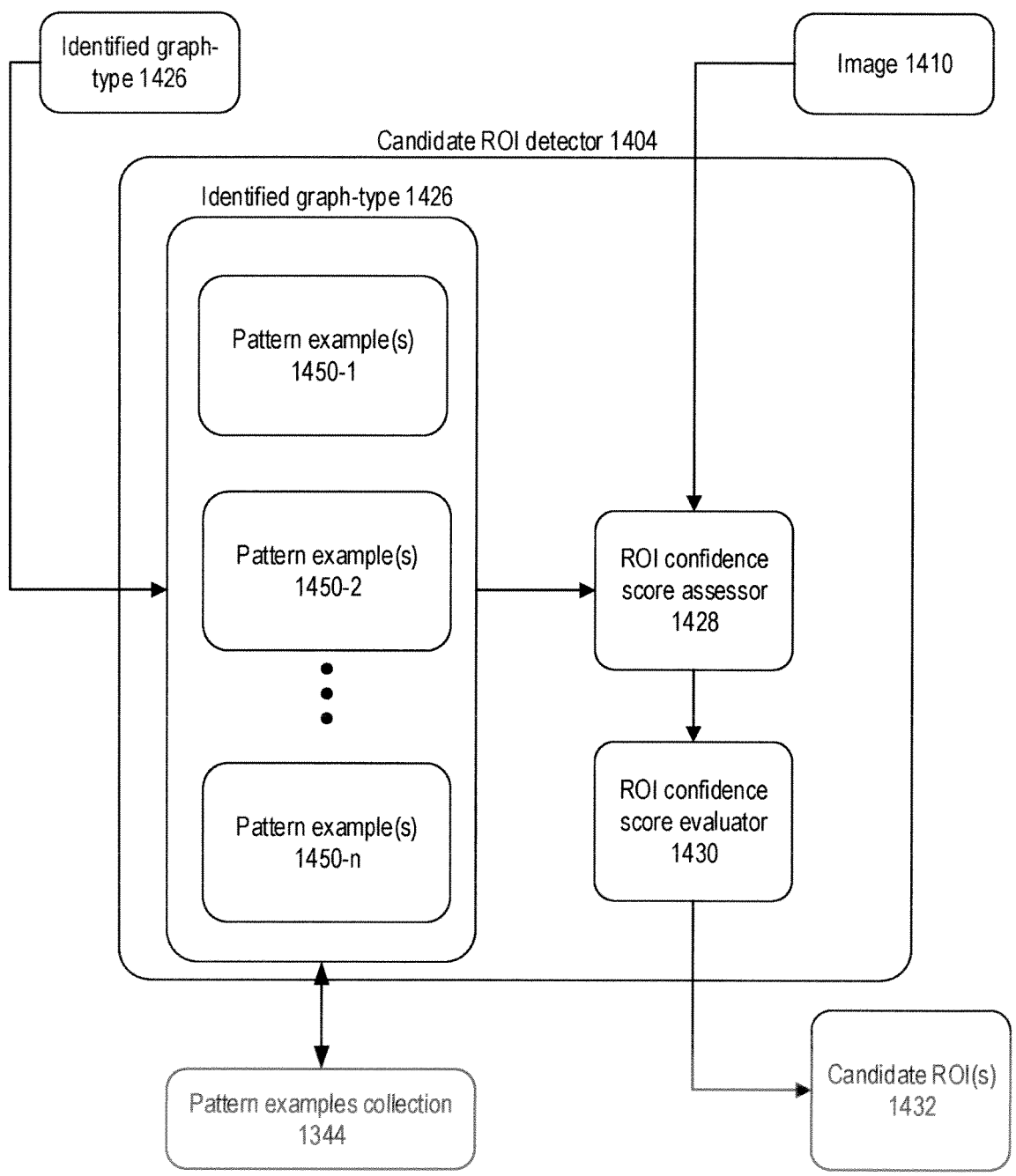

Proceeding to FIG. 14D, the identified graph-type 1426 may be passed to candidate ROI detector 1404. In one or more embodiments, candidate ROI detector 1404 may identify candidate ROIs by comparing example images of a pattern with image 1410. In one or more such embodiments, this may include matching and/or computation of a normalized correlation score between image 1410 and a respective example image. The normalized correlation scores may indicate a similarity between the example images of a pattern and image 1410. In some embodiments, a matchlmage action may be utilized for this purpose.

In some embodiments, matching that includes a sliding window method may be utilized to compute correlation scores for the identification of candidate ROIs 1432. For instance, portions or patches of an example image (e.g., pattern example 1350-2) may be overlaid on image 1410 in a plurality of positions, such as by being slid horizontally and vertically over image 1410. In such instances, a correlation score may be computed for each patch position (i.e., each of the plurality of positions), and candidate ROIs 1432 may be identified as patch positions with an associated correlation score that satisfies one or more criteria. In various embodiments, the sliding window method may be utilized when image 1410 is larger than the example images. In various embodiments, the correlation scores may be compared to a threshold to determine candidate ROIs 1432. In other embodiments, the correlation scores may be compared to each other to determine candidate ROIs 1432. For example, the top five correlation scores for each example image may be selected as candidate ROIs 1432.

In one or more embodiments, candidate ROI detector 1404 may retrieve one or more pattern examples associated with the identified graph-type 1426 from pattern examples collection 1344 (e.g., pattern example(s) 1450-1, 1450-2, 1450-*n*. For instance, if identified graph-type 1426 corresponds to graph type 1346-2, pattern examples 1354-1, 1354-2, 1354-*n* may be retrieved from pattern examples collection 1344.

In some embodiments, candidate ROI detector 1404 may include ROI confidence score assessor (RCSA) 1428 and ROI confidence score evaluator (RCSE) 1430. In various embodiments, RCSA 1428 may compute one or more confidence scores associated with each of pattern examples 1450-1, 1450-2, 1450-*n*. In various such embodiments, RCSE 1430 may determine one or more candidate ROIs 1432 based on the confidence scores. For example, for each pattern associated with the identified graph type 1426 of image 1410, the associated set of pattern example(s) may be retrieved from pattern examples collection 1344 and for each pattern example, a determined number of ROIs in image 1410 that have high correlations with a respective pattern example may be selected as candidate ROIs 1432. In a further example, the five ROIs in image 1410 that correlate with each respective pattern example the closest may be selected as candidate ROIs 1432.

In one or more embodiments, pseudo code for operations performed by candidate ROI detector 1404 may include one or more of:

```
1:      listOfPatterns ← getPatterns(graph-type)
2:      I ← input image
3:      k ← number of best ROIs listOfROI ← [ ]
4:      for each pattern p in listOfPatterns do
5:          for each example image i of p do
6:              l ← detectCandidateROI(I, i, k)
7:              listOfROI.append(l)
8:          end for
9:      end for
```

Figure 14E:
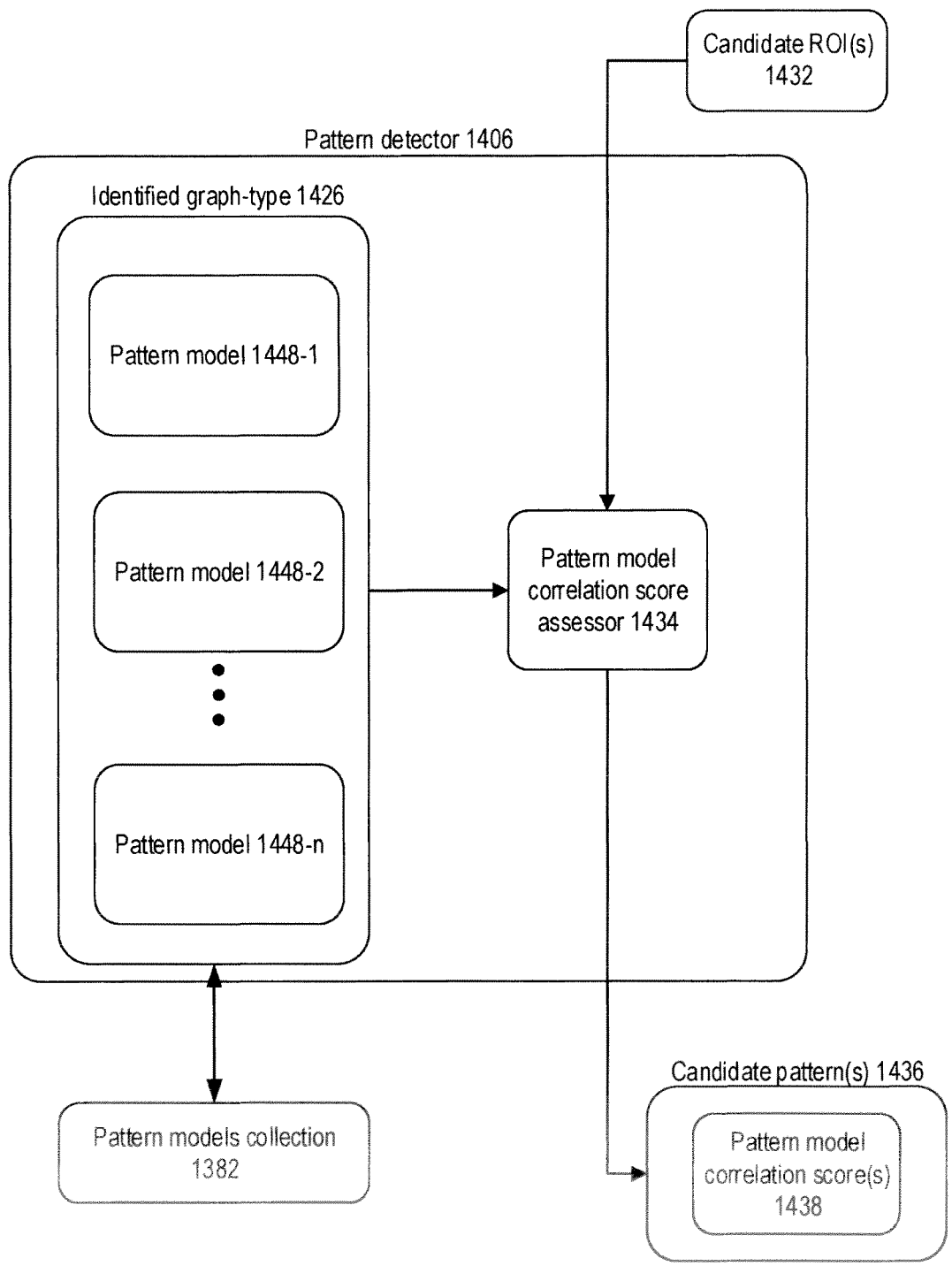

Moving to FIG. 14E, the candidate ROIs 1432 may be passed to pattern detector 1406. In various embodiments, pattern detector 1406 may retrieve one or more pattern models associated with the identified graph-type 1426 and each of the patterns associated with the candidate ROIs 1432 from pattern models collection 1382 (e.g., pattern models 1448-1, 1448-2, 1448-*n*. In some embodiments, pattern detector 1406 may include pattern model correlation score assessor (PMCSA) 1434. In various embodiments, PMCSA 1434 may compute one or more confidence or correlation scores associated with each of pattern models 1448-1, 1448-2, 1448-*n* to determine one or more candidate pattern(s) 1436 in image 1410. In one or more embodiments, PMSCA 1434 may utilize one or more of pattern model classifiers 1368 to compute the correlation scores associated with each of the pattern models. For example, a pattern model classifier trained on examples of a respective pattern may be used to generate the pattern model correlations score for the respective pattern.

Figure 14F:
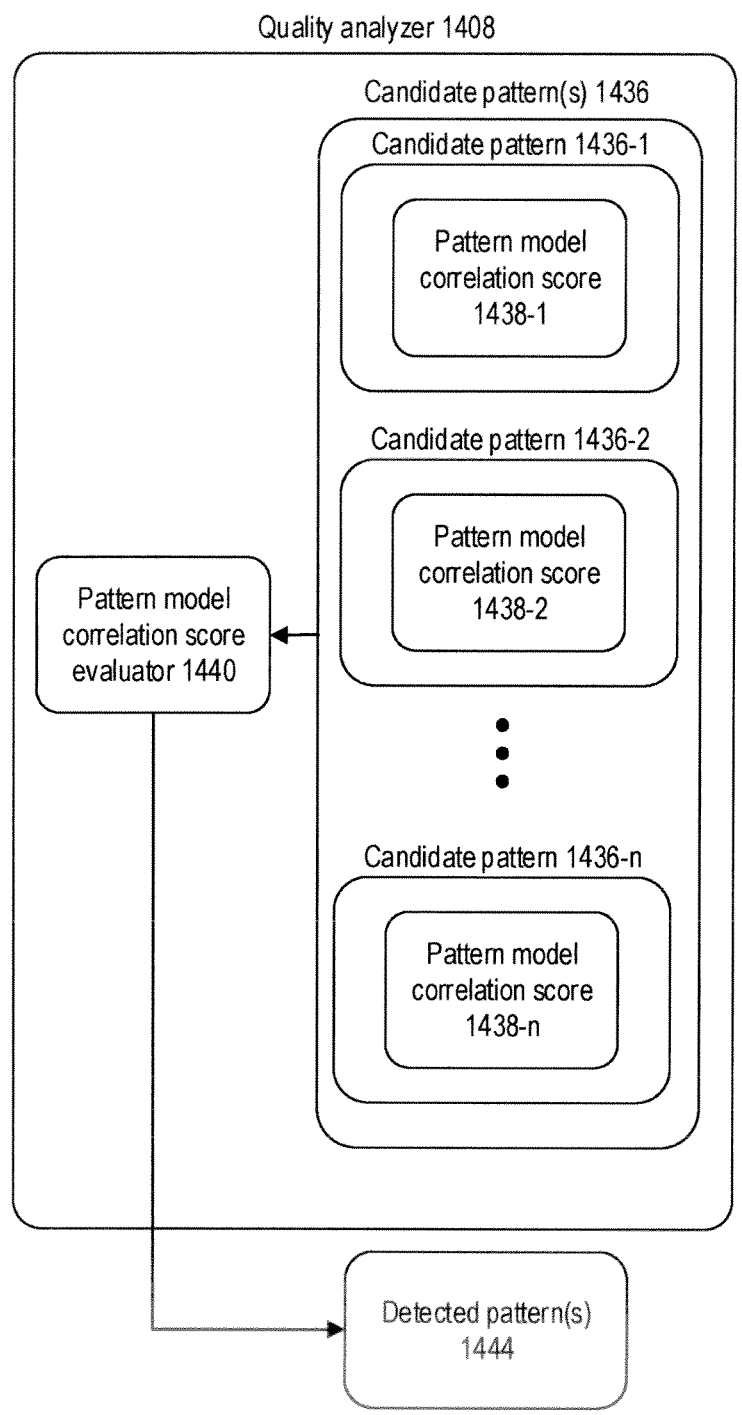
Figure 14G:
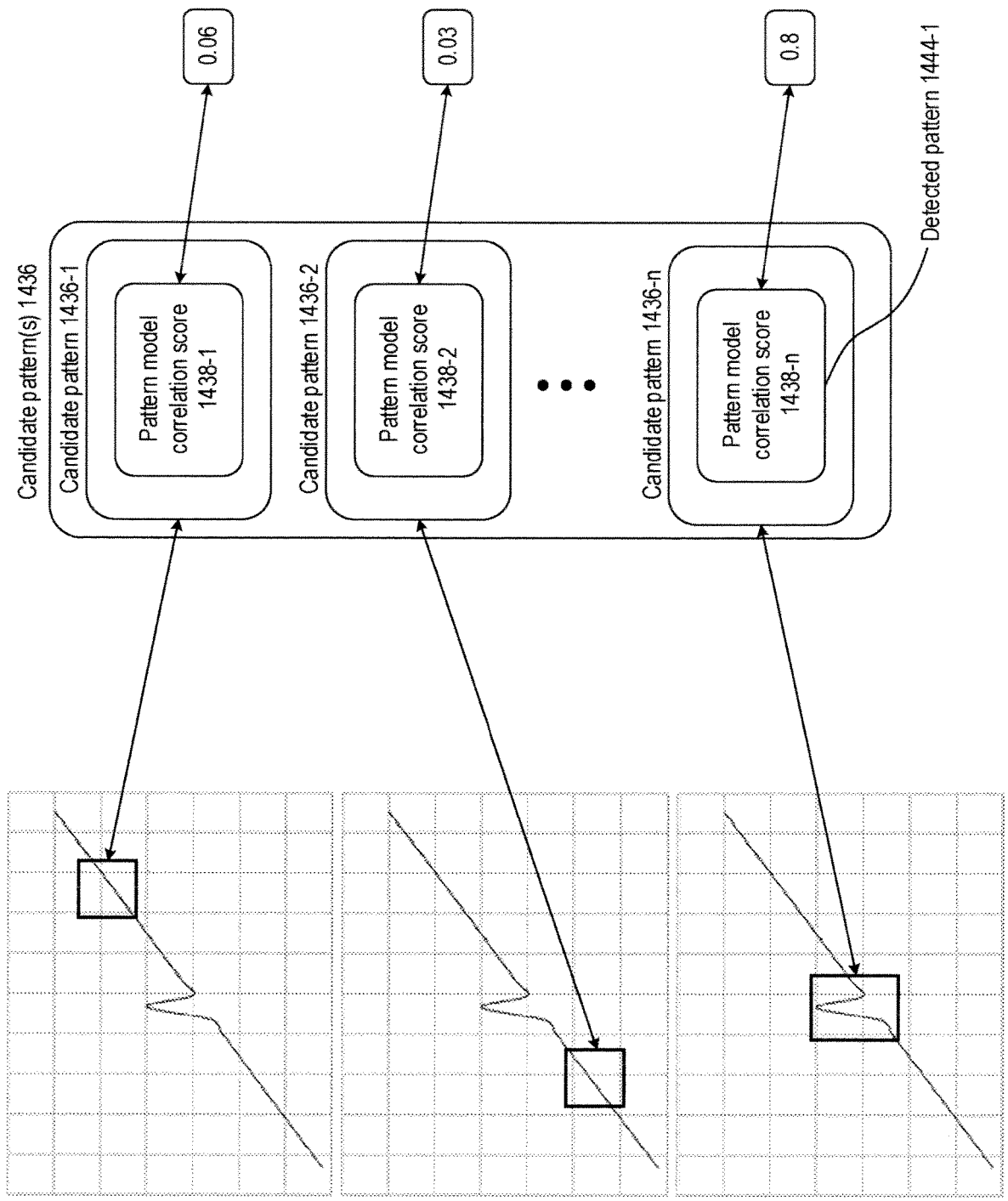

In FIG. 14F, one or more candidate patterns 1426 along with their respective pattern model correlation scores 1438 may be passed to quality analyzer 1408. In some embodiments, quality analyzer 1408 may include a pattern model correlation score evaluator (PMCSE) 1440. In some such embodiments, PMCSE 1440 may determine one or more detected patterns 1444 associated with image 1410 based on an evaluation of the pattern model correlation scores. For example, in FIG. 14G, candidate pattern 1436-1 may be associated with a pattern model correlation score 1438-1 of 0.06, candidate pattern 1436-2 may be associated with a pattern model correlation score 1438-2 of 0.03, and candidate pattern 1436-*n* may be associated with a pattern model correlation score **1438-*n* of 0.8. In such examples, PMCSE 1440 may select candidate pattern 1426-*n* as a detected pattern 1444-1 in detected patterns 1444 in response to determining candidate pattern 1436-*n* has a pattern model correlation score that meets or exceeds a threshold. In other words, candidate patterns that are not associated with a strong enough pattern model correlation score may be removed prior to passing the detected patterns 1444 to summary generator 1254. In various embodiments, instead of a threshold, a classifier (similar to graph-type classifier 1366 and/or pattern model classifier 1368**) may be trained to determine whether a candidate pattern should be selected as a detected pattern. In various such embodiments example data including a set of pattern model correlation scores and an indication of whether the candidate pattern associated with each of the correlation scores was selected as a detected pattern may be used to train the classifier.

Figure 15:
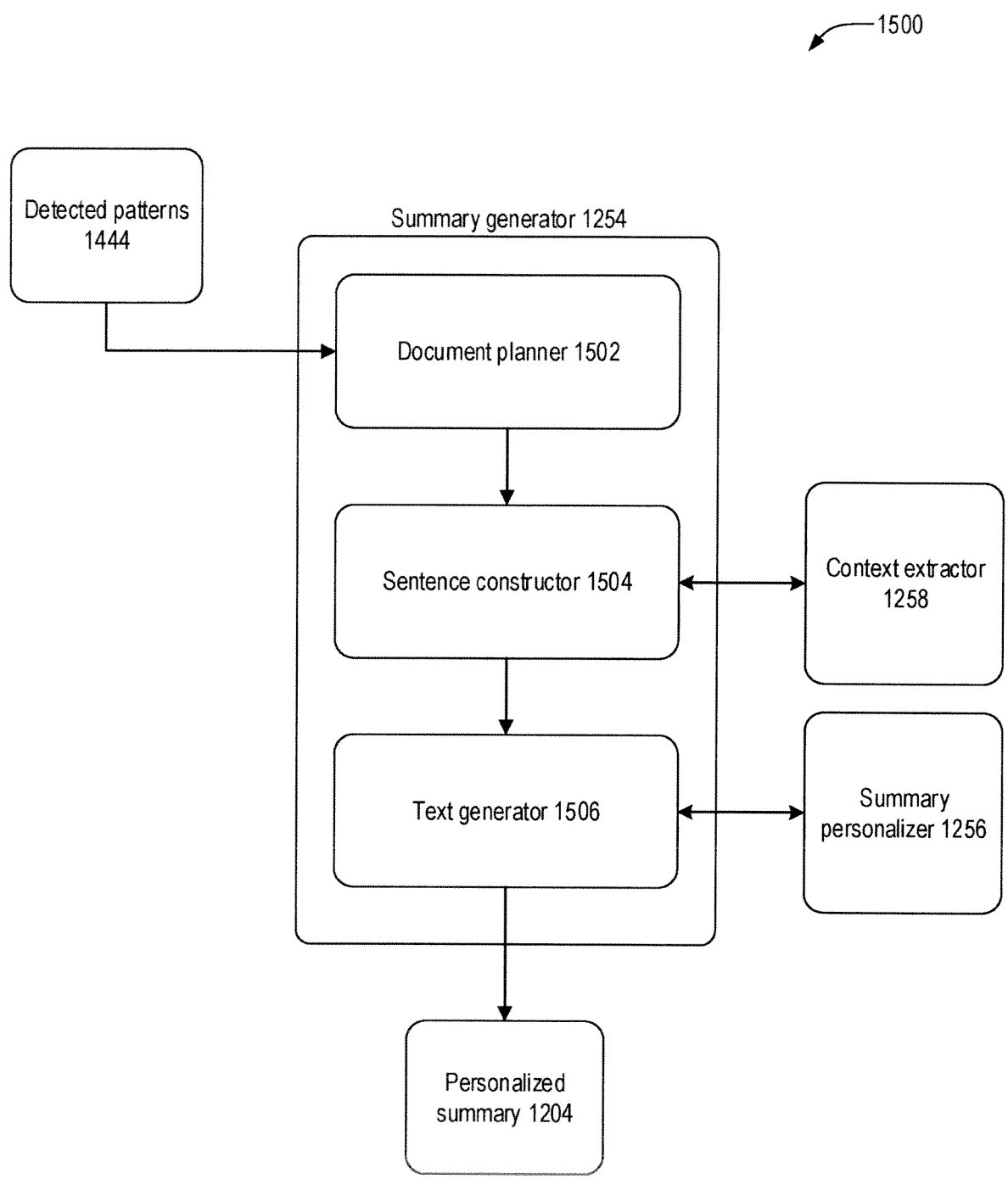
FIG. 15 illustrates an example processing flow of a summary generator.

FIG. 15 illustrates an example of a processing flow 1500 of summary generator 1254 that may be representative of various embodiments. In processing flow 1500, summary generator 1254 may include document planner 1502, sentence constructor 1504, and text generator 1506. In some embodiments, summary generator 1254 may produce personalized summary 1204 based on detected patterns 1444. In some such embodiments, summary generator 1254 may generate personalized summary 1204 based on information received from one or more of context extractor 1258 and summary personalizer 1256. In one or more embodiments, summary generator 1254 may perform natural language processing. For instance, sentence constructor 1504 and context extractor 1258 may generate natural language from context extracted from an example image. Embodiments are not limited in this context.

As previously described, each pattern may be associated with an insight message and one or more text templates. In various embodiments, the one or more text templates may be designed to express in natural language the insight included in the insight message. In various such embodiments, this may be in combination with other closely related insights. In some embodiments, summary generator 1254 may begin with document planner 1502. In one or more embodiments, document planner 1502 may arrange the insight messages in a logical manner (e.g., based on or more of a priority level or user preferences). Document planner 1502 may then pass the arranged insight messages, for instance, as a group, to sentence constructor 1504.

In one or more embodiments, sentence constructor 1504 may match the arranged insight messages to one or more text templates. In various embodiments, sentence constructor 1504 may insert one or more portions of context identified by context extractor 1258 into one or more of the text templates. For example, a sample text template may be "A steady increase in data points with a higher outlier or spike." In such examples, 'data points' may not always be part of the text template, and instead it may be replaced with relevant context identified by context extractor 1258. Thus, with the appropriate context, the sample text template may be modified to be "A steady increase in dollar amount over time with a higher outlier or spike."

In some embodiments, PGS 1202 may be designed to work with whatever information is available. Accordingly, a text template may remain as is if context is unavailable. However, with the availability of context, either from a user or extracted by context extractor 1258, a text template may be converted into a more fine-grained text template based on the context. In various embodiments, text generator 1506 may check the grammatical correctness of the text templates and adds any needed markup in order to produce personalized summary 1204. In one or more embodiments, text generator 1506 may add one or more markups or make one or more revisions based on input received via summary personalizer 1256.

Figure 16:
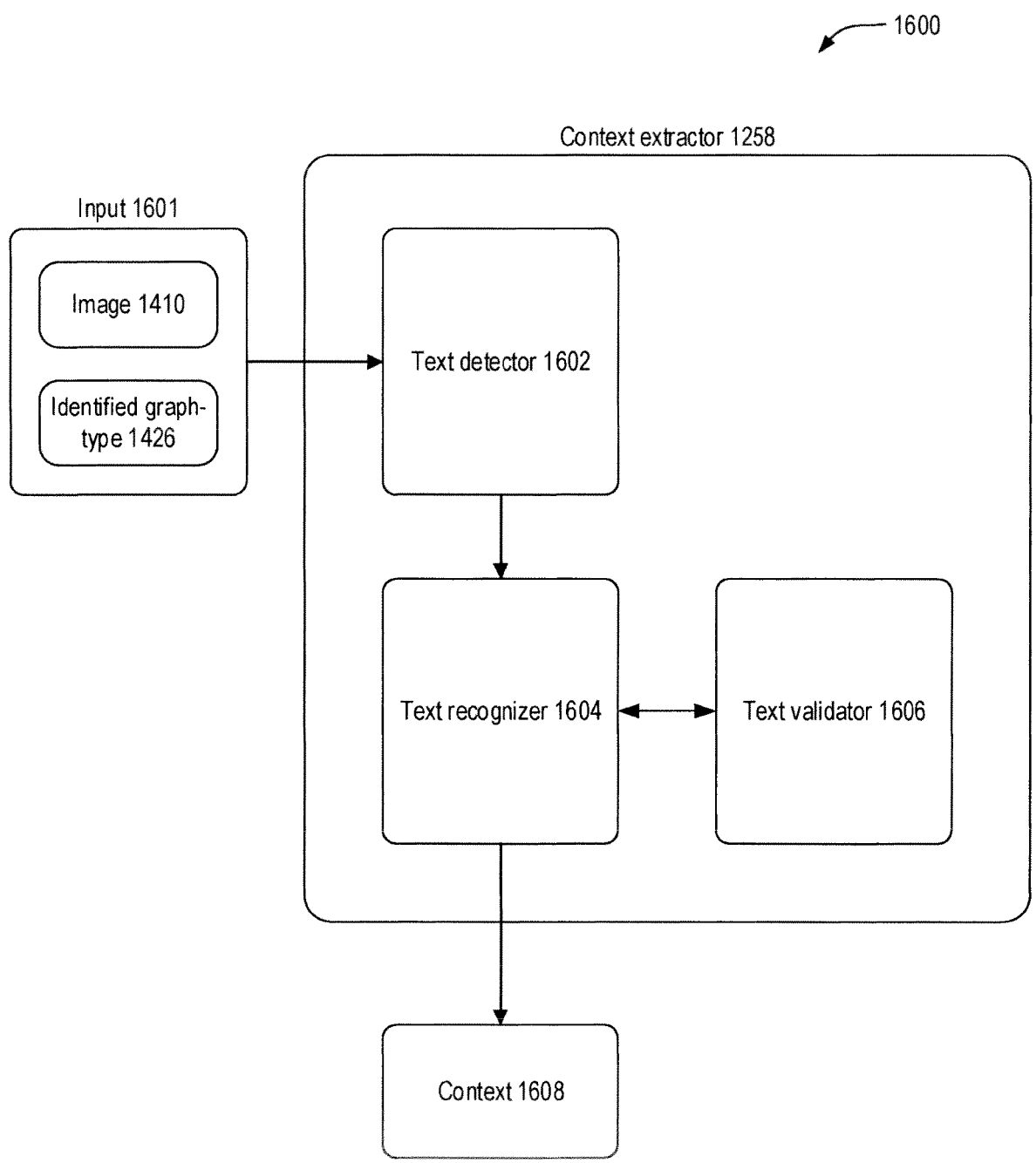
FIG. 16 illustrates an example processing flow of a context extractor.

FIG. 16 illustrates an example of a processing flow 1600 of context extractor 1258 that may be representative of various embodiments. In processing flow 1600, context extractor 1258 may include text detector 1602, text recognizer 1604, and text validator 1606. In one or more embodiments described herein, context extractor 1258 may detect a portion of input 1601 with contextual information. In one or more such embodiments, context extractor 1258 may generate or extract context 1608 (e.g., textual elements) from the portion of input 1601 with contextual information. In some embodiments, input 1601 be the same or similar to input 1201. Thus, in the illustrated embodiments, input 1601 includes image 1410 and identified graph-type 1426. In one or more embodiments context extractor 1258 may utilize identified graph-type 1426 to extract context 1608 from image 1410. In one or more such embodiments, know the graph type may provide prior knowledge of the components of an image, such as the location of axes, and data labels. In various embodiments, context extractor 1258 may utilize optical character recognition (OCR) and/or computer vision. Embodiments are not limited in this context.

In one or more embodiments, context extraction may include multiple steps. For instance, text detector 1602 may detect contextual information, such as textual elements in image 1410. In some embodiments, text recognizer 1604 may then determine whether the detected textual elements include one or more of a title, a name, an axis label, or a legend, and extract the detected textual elements. In various embodiments, text validator 1606 may be included in context extractor 1258 to provide the ability to request verification from a user for the proper recognition of textual elements. In some embodiments, text validator 1606 may enable a user to modify the extracted textual elements to improve accuracy of context extractor 1258.

As context extractor 1258 knows the graph type of image 1410, it also has prior knowledge of the graph, and may use this information to rectify a text detection algorithm to avoid false positives. In some instances, detected text blobs (the output of text detector 1602) may then be feed to text recognizer 1604. In various embodiments, a text recognition model may be created offline based on one or more known, supported, and non-cursive font types, such as Arial. After detection, recognition, extraction, and, if necessary, verification, context extractor 1258 may parse the information extracted from image 1410 so that PGS 1202 may consume it as context 1608. For instance, a data label such as $10,000,000 may become "dollar amount". Similarly, "Nov-16" and "Mar-17" may become "over time".

In a further example, a graph image with revenue on the y-axis and year on the x-axis may be received for summarization. In such examples, context extractor 1258 may identify that the values on the y-axis may include a dollar sign (e.g., 'S') and the values on the x-axis may be four digit numbers (e.g., 2014, 2015, 2016). Based on this information, context extractor 1258 may determine that the y-axis represents some type of resource information and the x-axis represents the year. In various embodiments, context extractor 1258 may identify a title of 'Revenue v. Year' in the graph image. In various such embodiments, the context extractor 1258 may determine the type of monetary information represented by the y-axis is revenue. In one or more embodiments, this information may enable the summary to be detailed. For instance, rather than a summary that includes "a linear increase", a detailed summary that includes "a linear increase in revenue by year". In another instance, context extractor 1258 may identify axis labels, such as "home price" and "square foot". In such other instances, the axis labels may be used to contextually enrich the summary In various embodiments described herein, more contextual information extracted from the graph image may result in a more detailed summary.

Figure 17:
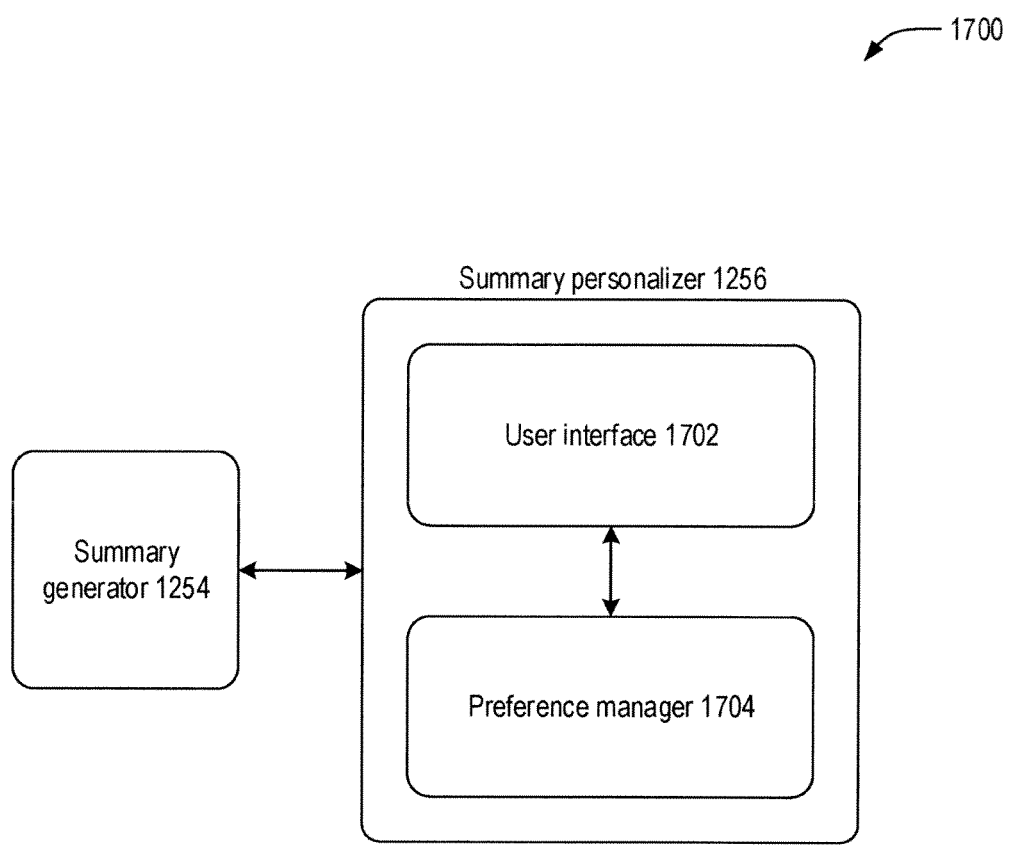
FIG. 17 illustrates an example processing flow of a summary personalizer.

FIG. 17 illustrates an example processing flow of a summary personalizer 1256 that may be representative of various embodiments. In processing flow 1700, summary personalizer 1256 may include user interface 1702 and preference manager 1704. In some embodiments, summary personalizer 1256 may enable a user to interact with PGS 1202 by personalizing a generated summary text. In some such embodiments, preference manager 1704 may utilize these interactions to learn one or more preferences of a user. After the user interaction, the revised summary text may become personalized summary 1204. Embodiments are not limited in this context.

In one or more embodiments, PGS 1202 may detect more than one pattern in input 1201, resulting in more than one text templates in the summary text. In one or more such embodiments, the multiple text templates may be arranged according to a priority level. In some embodiments, the priority level defined in input 1301 may be used to arrange the multiple text templates. As previously mentioned, the arrangement may initially be carried out by document planner 1502. In various embodiments, PGS 1202 is not limited to a static ordering schema based on static priority levels. In various such embodiments, instead of a static ordering schema, a flexible or dynamic ordering schema may be utilized to generate personalized summaries with natural-language text.

For instance, each text template may start with an assigned or initial priority level. In such instances, the assigned priority levels may be dynamically updated based on user preferences. Upgrading a text template may cause the priority level associated with the text template to be raised. Similarly, downgrading a text template may cause the priority level associated with the text template to be lowered. In some embodiments, a user may delete any of the generated text. In one or more embodiments, this information may be fed to document planner 1502 to be used in future summarizations. Accordingly, in various embodiments, PGS 1202 may enable a to tailor the generated natural-text summary (e.g., personalized summary 1204) based on one or more user preferences. In one or more embodiments, the personalization capability for the ordering of text templates may be the same or similar to content-based filtering, such as in recommender systems.

Figure 18:
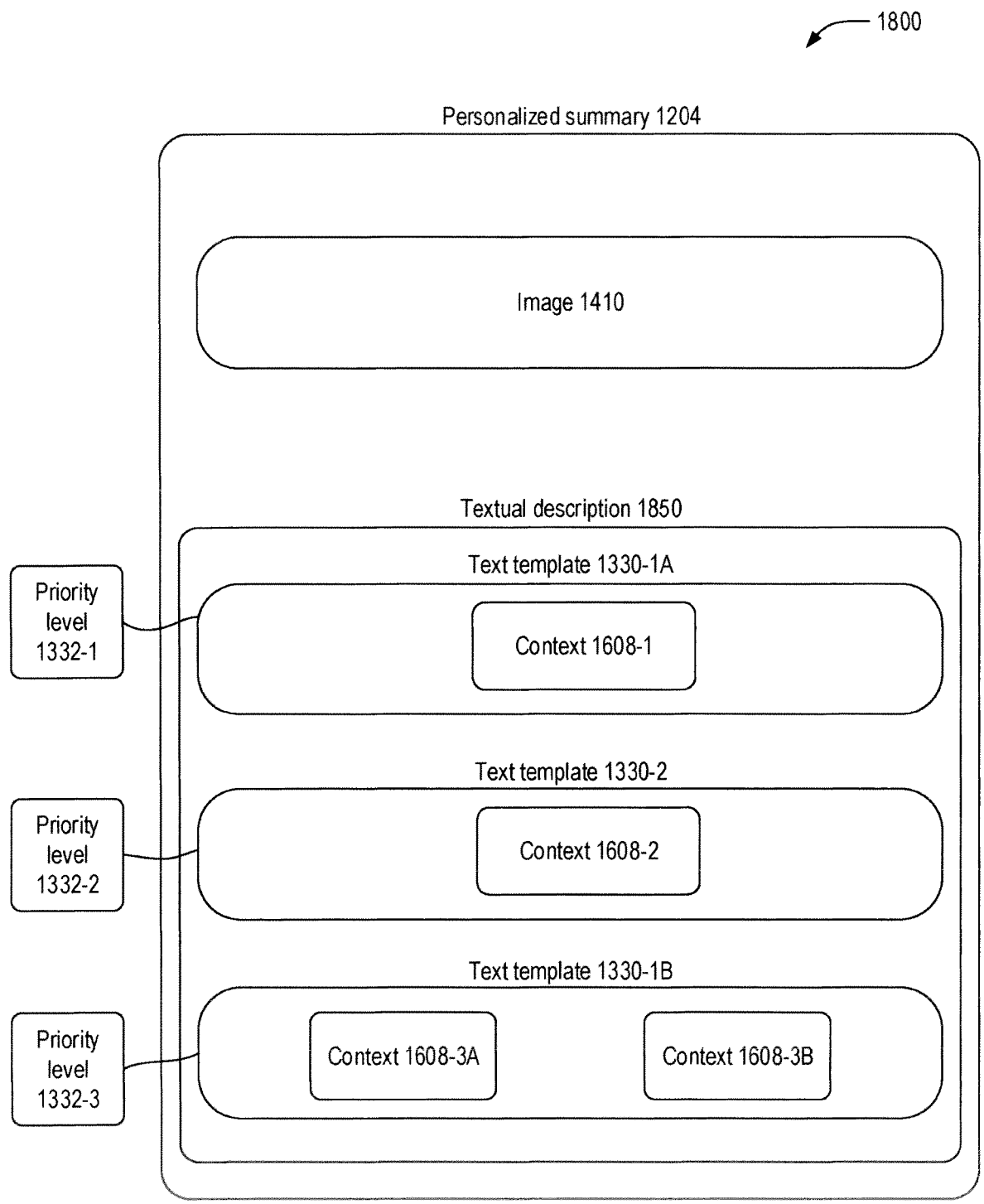
FIG. 18 illustrates an embodiment of a personalized summary

FIG. 18 illustrates an embodiment of personalized summary 1204. Personalized summary 1204 may include image 1410 and textual description 1850 with a plurality of text templates (e.g., text templates 1330-1A, 1330-1B, 1330-2. In the illustrated embodiments, text template 1330-1A may be placed first in the textual description 1850 of the personalized summary 1204 based on priority level 1332-1 being higher than priority levels 1332-2, 1332-3. Similarly, text template 1330-2 may be placed second based on priority level 1332-2 being higher than priority level 1332-3, but lower than priority level 1332-1. Further, context 1608-1 may be inserted into text template 1330-1A, context 1608-2 may be inserted into text template 1330-2, and contexts 1608-3A, 1608-3B may be inserted into text template 1330-1B. Embodiments are not limited in this context.

Figure 19A:
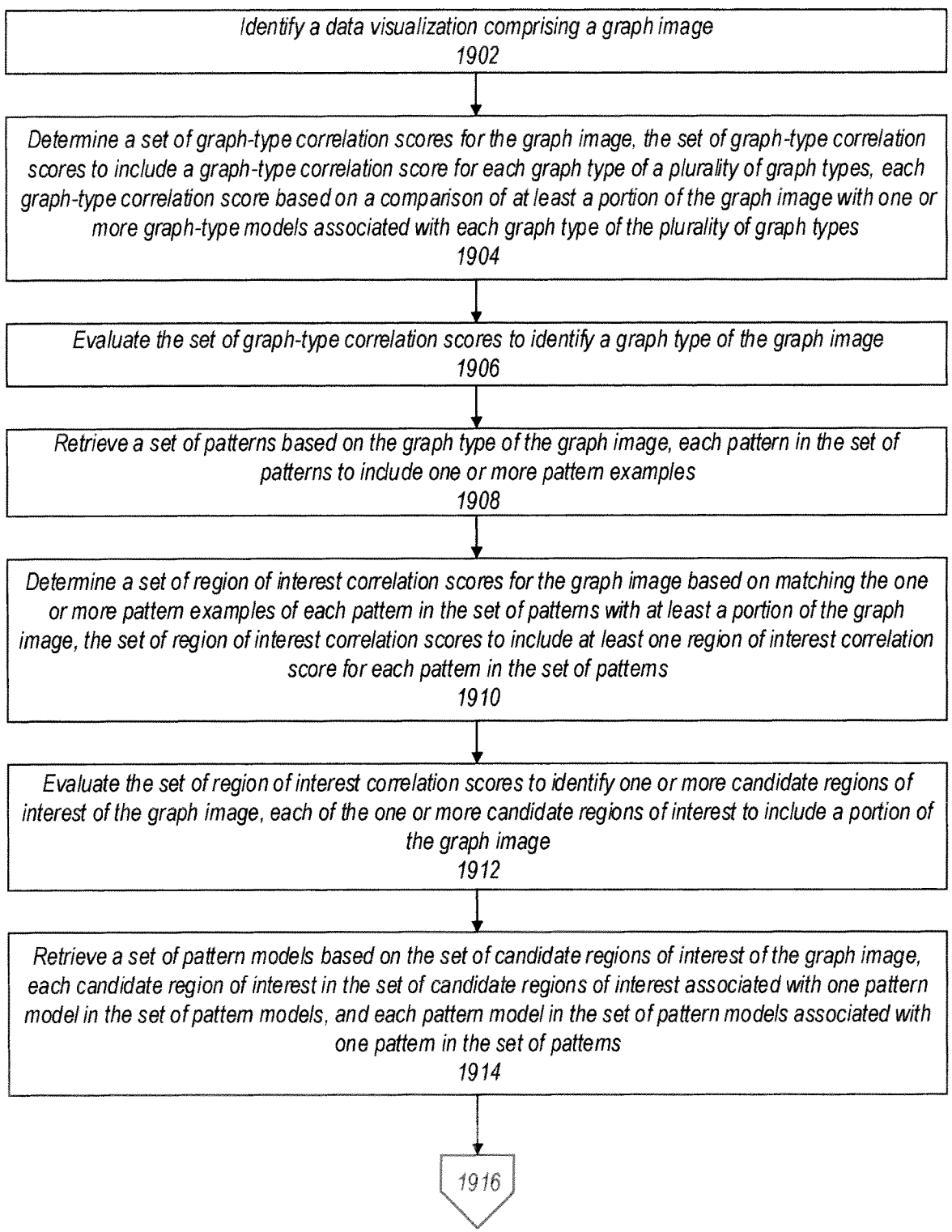
FIGS. 19A-19B illustrates an embodiment of a logic flow.
Figure 19B:
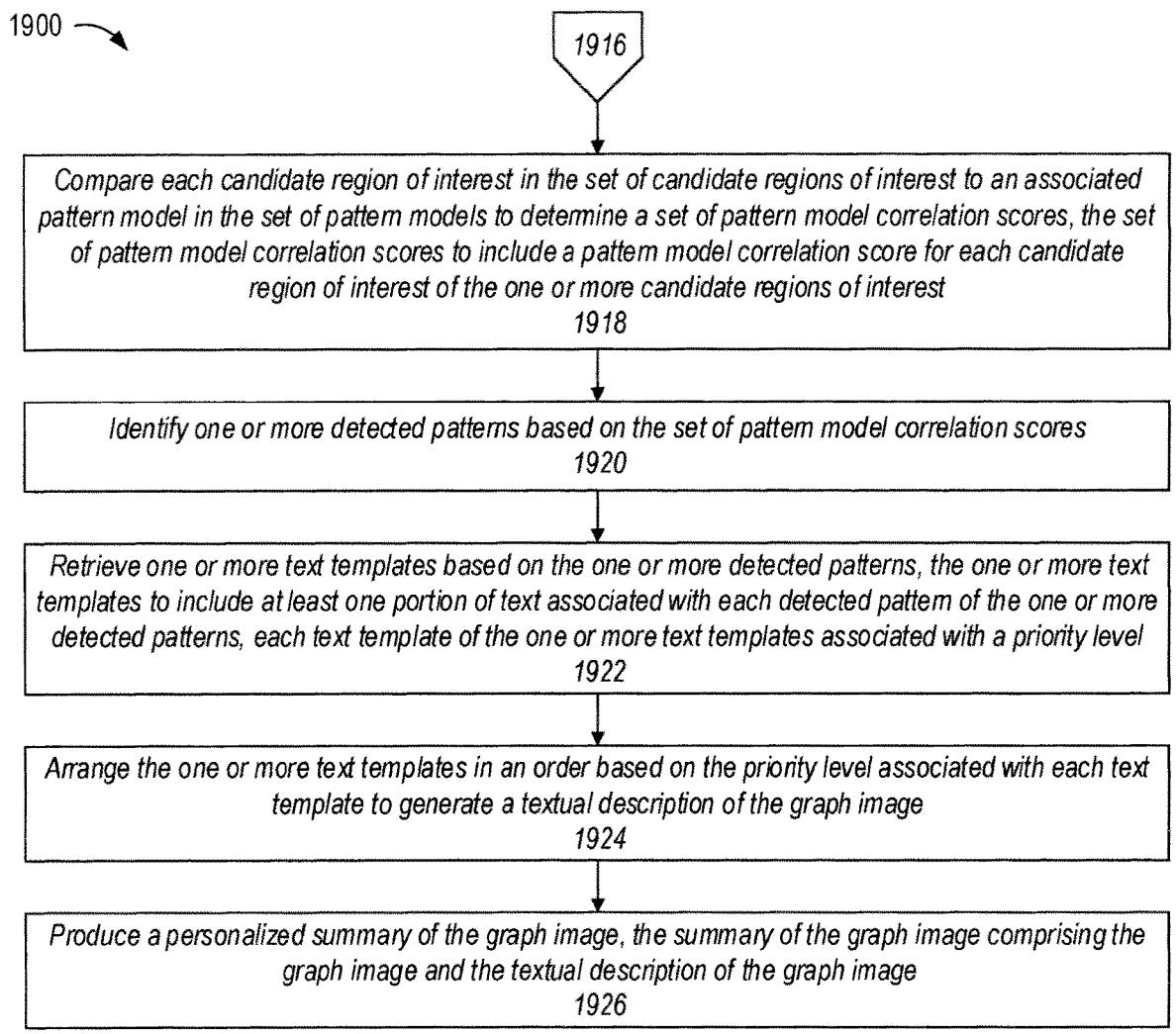

FIGS. 19A-19B illustrates an embodiment of a logic flow 1900. The logic flow 1900 may be representative of some or all of the operations executed by one or more embodiments described herein. More specifically, the logic flow 1900 may illustrate operations performed by processing circuitry 1220, and/or performed by other component(s) of personalized graph summarizer 1202, such as visual pattern detector 1251, personalized pattern creator 1252, summary generator 1254, summary personalizer 1256, or context extractor 1258. In one or more embodiments, these operations may be performed in conjunction with generating a personalized summary 1204 or learning a new graph-type or pattern model. Embodiments are not limited in this context.

In the illustrated embodiment shown in FIGS. 19A-19B, the logic flow 1900 may begin at block 1902. At block 1902 a data visualization comprising a graph image may be identified. For instance, visual pattern detector 1251 may identify a data visualization comprising a graph image in input 1201. In some embodiments, the data visualization comprising the graph image may be an image file received as input 1201. In various embodiments, identification of the data visualization may be automated.

Continuing to block 1904, a set of graph-type correlation scores with a graph-type correlation score for each graph type of a plurality of graph types may be determined. In logic flow 1900, each graph type correlation score may be based on a comparison of at least a portion of the graph image with one or more graph-type models associated with each graph type of the plurality of graph types. For instance, graph-type identifier 1402 may include GTCSA 1412 to compare the graph image (e.g., 1410) to each of graph types 1346-1, 1346-2, 1346-n using graph-type models 1372-1, 1372-2, 1372-n, respectively. In such instances, one or more of graph-type models 1372-1, 1372-2, 1372-n may include graph-type classifier 1366 or another graph-type classifier generated by classifier trainer 1308. In some embodiments, each graph-type model may take the graph image as input and output an associated graph-type correlation score. For example, GTCSA 1412 may provide image 1410 as input to graph-type model 1372-2 to generate graph-type correlation score 1422-2 for graph type 1346-2. In such examples, similarly GTCSA 1412 may generate graph-type correlation score 1422-1 for graph type 1346-1 using graph-type model 1372-1 and graph-type correlation score 1422-n for graph type 1346-n using graph-type model 1372-n. In one or more embodiments, determination of the set of graph-type correlation scores may be automated.

Proceeding to block 1906, the set of graph-type correlation scores may be evaluated to identify a graph type of the graph image. In some embodiments, graph-type correlation score evaluator 1424 may compare graph-type correlation scores 1422-1, 1422-2, 1422-n to determine identified graph-type 1426. For instance, graph type 1346-2 may be selected as identify graph-type 1426 in response to having the highest graph-type correlation score. In various embodiments, identification of the graph type of the graph image may be automated.

At block 1908 a set of patterns may be retrieved based on the graph type of the graph image. In logic flow 1900, each pattern in the set of patterns may include one or more pattern examples. For instance, if graph type 1346-1 is selected as identified graph-type 1426, then patterns 1348-1, 1348-2, 1348-n may be retrieved from pattern examples collection 1344. In such instances, pattern 1348-1 may include pattern examples 1350-1, pattern 1348-2 may include pattern examples 1350-2, and pattern 1348-n may include pattern examples 1350-*n*. In some embodiments, retrieval of the set of patterns may be automated.

Continuing to block 1910, a set of region of interest correlation scores may be determined for the graph image based on matching the one or more pattern examples of each pattern in the set of patterns with at least a portion of the graph image. In logic flow 1900, the set of region of interest correlation scores may include at least one region of interest correlation score for each pattern in the set of patterns. For instance, ROI confidence score assessor 1428 may determine a confidence score for each of pattern example(s) 1450-1, 1450-2, 1450-*n*. In some embodiments, the matching may utilize a sliding window method to compute correlation scores. For example, portions or patches of the example image (e.g., pattern example 1350-2) may be overlaid on image 1410 in a plurality of positions, such as by being slid horizontally and vertically over image 1410. In such instances, a correlation score may be computed for each patch position (i.e., each of the plurality of positions). In one or more embodiments, determination of the set of region of interest correlation scores may be automated.

Proceeding to block 1912, the set of region of interest correlation scores may be evaluated to identify one or more candidate regions of interest comprising in the graph image with each candidate region of interest comprising a portion of the graph image. In various embodiments, ROI confidence score evaluator 1430 may evaluate the set of region of interest correlation scores determined by ROI confidence score assessor 1428 to identify candidate ROI(s) 1432. In embodiments that utilize the sliding window method to compute the ROI correlation scores, candidate ROIs 1432 may be identified as patch positions with an associated correlation score that satisfies one or more criteria. In some embodiments, the correlation scores may be compared to a threshold to determine candidate ROIs 1432. In other embodiments, the correlation scores may be compared to each other to determine candidate ROIs 1432. For example, the top five correlation scores for each example image may be selected as candidate ROIs 1432. In various embodiments, identification of the one or more candidate regions of interest may be automated.

At block 1914 a set of pattern models may be retrieved based on the set of candidate regions of interest of the graph image. In logic flow 1900 each candidate region of interest in the set of candidate regions of interest may be associated with one pattern model in the set of pattern models and each pattern model in the set of pattern models may be associated with one pattern in the set of patterns. In various embodiments, the set of pattern models may include the pattern model for each pattern associated with a candidate region of interest. For instance, if candidate ROIs 1432 include one candidate ROI associated with pattern 1352-1 and one candidate ROI associated with pattern 1352-2, then the set of pattern models retrieved may include pattern model 1376-1 and pattern model 1376-2. In some embodiments, retrieval of the set of pattern models may be automated. At block 1916 the logic flow 1900 may proceed to block 1918 in FIG. 19B.

Continuing to block 1918, each candidate region of interest in the set of candidate regions of interest may be compared to an associated pattern model in the set of pattern models to determine a set of pattern model correlation scores. In logic flow 1900, the set of pattern model correlation scores may include a pattern model correlation score for each candidate region of interest of the one or more candidate regions of interest. For instance, graph-type identifier 1406 may include PMCSA 1434 to compare each candidate ROI in the set of candidate ROIs to an associated pattern model. In such instances, PMCSA 1434 may operate the same or similar to GTCSA 1412, except with pattern models instead of graph-type models. In various embodiments, determining the set of pattern model correlation scores may be automated.

Proceeding to block 1920, one or more detected patterns may be identified based on the set of pattern model correlation scores. For instance, pattern model correlation score evaluator 1440 may compare pattern model correlation scores 1438-1, 1438-2, 1438-*n* to identify detected pattern(s) 1444. In some embodiments, the correlation scores may be compared to a threshold to determine detected pattern(s) 1444. In other embodiments, the correlation scores may be compared to each other to determine detected pattern(s) 1444. For example, the top five correlation scores may be selected as detected pattern(s) 1444. In various embodiments, identification of the one or more candidate regions of interest may be automated.

At block 1922, one or more text templates may be retrieved based on the one or more detected patterns. In logic flow 1900, the one or more text templates may include at least one portion of text associated with each detected pattern of the one or more detected patterns, and each text template of the one or more text templates may be associated with a priority level. For instance, if a detected pattern corresponds to input 1301, text template 1330 may be retrieved. In such instances, text template 1330 may be associated with priority level 1332. In various embodiments, retrieval of the one or more text templates may be automated.

Continuing to block 1924, the one or more text templates may be arranged in an order based on the priority level associated with each text template to generate a textual description of the graph image. For instance, summary generator 1254 may operate to generate textual description 1850 of the graph image based on the priority levels associated with each text template. In various embodiments, the textual description may be personalized based on input from context extractor 1258 and/or summary personalizer 1256. In various embodiments, generation of the textual description may be automated. Proceeding to block 1926, a personalized summary comprising the graph image and the textual description of the graph image may be produced. For example, personalized summary 1204 may be produced by summary generator 1254 that includes image 1410 and textual description 1850 (see e.g., FIG. 18). In various embodiments, generation of the textual description may be automated. In some embodiments, production of the personalized summary may be automated.

In various embodiments, processing circuitry 1220 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processing circuitry 1220 of system 1205 may be selected to efficiently perform the generations of personalized summary 1204 based on input 1201. Alternatively, or additionally, the processors of one or more node devices may be selected to efficiently perform one or more operations described herein. In some embodiments, one or more operations described herein may be performed at least partially in parallel. By way of example, the processing circuitry 1220 or other processors may incorporate a single-instruction multiple-data (SIMD) architecture, may incorporate multiple processing pipelines, and/or may incorporate the ability to support multiple simultaneous threads of execution per processing pipeline.

In various embodiments, one or more portions of the processing or logic flows described herein, including the components of which each is composed, may be selected to be operative on whatever type of processor or processors that are selected to implement applicable ones of the processing circuitry 1220 or other processors utilized by PGS 1202. In various embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for processing circuitry 1220 or other processors. Where one or more device drivers are included, those device drivers may provide support for any of a variety of other components, whether hardware or software components, described herein.

In various embodiments, each of the storage 1215 and memory 1210 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in a specific embodiment, the storage 1215 of one or more of the node may be implemented with a redundant array of independent discs (RAID) of a RAID level selected to provide fault tolerance to prevent loss of one or more of these datasets and/or to provide increased speed in accessing one or more of these datasets.

In various embodiments, one or more of the interfaces described herein (e.g., interfaces 1225 or user interface 1702) may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 1580 and 1780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

In various embodiments, interfaces 1225 of PGS 1202 may include one or more network interfaces that employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, a network interface of interfaces 1225 may be implemented with multiple copper-based or fiber-optic based network interface ports to provide redundant and/or parallel pathways in exchanging data.

In various embodiments, the processing and/or storage resources of PGS 1202 may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission and/or distribution via network interface of interfaces 1225 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
    identify a data visualization comprising a graph image;
    determine a set of graph-type correlation scores for the graph image, the set of graph-type correlation scores to include a graph-type correlation score for each graph type of a plurality of graph types, each graph-type correlation score based on a comparison of at least a portion of the graph image with one or more graph-type models associated with each graph type of the plurality of graph types;
    evaluate the set of graph-type correlation scores to identify a graph type of the graph image;
    retrieve a set of patterns based on the graph type of the graph image, each pattern in the set of patterns to include one or more pattern examples;
    determine a set of region of interest correlation scores for the graph image based on matching the one or more pattern examples of each pattern in the set of patterns with at least a portion of the graph image, the set of region of interest correlation scores to include at least one region of interest correlation score for each pattern in the set of patterns;
    evaluate the set of region of interest correlation scores to identify one or more candidate regions of interest of the graph image, each of the one or more candidate regions of interest to include a portion of the graph image;
    retrieve a set of pattern models based on the set of candidate regions of interest of the graph image, each candidate region of interest in the set of candidate regions of interest associated with one pattern model in the set of pattern models, and each pattern model in the set of pattern models associated with one pattern in the set of patterns;
    compare each candidate region of interest in the set of candidate regions of interest to an associated pattern model in the set of pattern models to determine a set of pattern model correlation scores, the set of pattern model correlation scores to include a pattern model correlation score for each candidate region of interest of the one or more candidate regions of interest;
    identify one or more detected patterns based on the set of pattern model correlation scores;
    retrieve one or more text templates from a computer-readable storage medium based on the one or more detected patterns, the one or more text templates to include at least one portion of text associated with each detected pattern of the one or more detected patterns, each text template of the one or more text templates associated with a priority level;
    arrange the one or more text templates in an order based on the priority level associated with each text template to generate a textual description of the graph image; and
    generate a personalized summary of the graph image based on the textual description with the one or more text templates ordered based on the priority level associated with each text template.

2. The apparatus of claim 1, wherein the processor is caused to perform operations comprising:
    detect a portion of the graph image with contextual information;
    extract a textual element from the portion of the graph image with contextual information; and
    insert at least a portion of the textual element extracted from the portion of the graph image with contextual information into at least one text template of the one or more text templates to generate the textual description of the graph image.

3. The apparatus of claim 1, wherein the processor is caused to perform operations comprising:
    identify a component of the graph image based on the graph type;
    detect a portion of the graph image with potential contextual information; and
    determine contextual information is absent from the portion of the graph image with potential contextual information based on the component of the graph image identified based on the graph type.

4. The apparatus of claim 1, matching a pattern example of a pattern in the set of patterns with at least a portion of the graph image comprising:
    overlay at least a portion of the pattern example on the graph image in a plurality of positions; and
    compute a region of interest correlation score in the set of region of interest correlation scores for each of the plurality of positions.

5. The apparatus of claim 1, wherein the processor is caused to perform operations comprising:
    receive an additional pattern example; and
    update a pattern model in the set of pattern models based on the additional pattern example.

6. The apparatus of claim 1, each pattern model correlation score to indicate a likelihood of a respective candidate region of interest of the one or more candidate regions of interest including an associated pattern.

7. The apparatus of claim 1, wherein the processor is caused to perform operations comprising:
    present the one or more text templates arranged based on the priority level associated with each template sentence via a user interface;
    arrange the one or more text templates in an updated order based on input received via the user interface;
    alter a priority level of at least one of the one or more text templates based on the updated order; and
    generate the textual description of the graph image based on the priority level associated with each text template, the priority level associated with each text template to include the priority level of the at least one of the one or more text templates altered based on the updated order.

8. The apparatus of claim 1, wherein the processor is caused to perform operations comprising:
alter the priority level of a text template based on the input received via a user interface.

9. The apparatus of claim 1, at least one pattern in the set of patterns comprising a personalized pattern, wherein the processor is caused to perform operations comprising:
create the personalized pattern based on one or more example graph images and one or more pattern examples identified in the example graph images based on input received via a user interface.

10. The apparatus of claim 9, wherein the processor is caused to perform operations comprising:
associate one or more of a priority level, a template sentence, or a graph type with the personalized pattern based on input received via the user interface.

11. A computer-implemented method, comprising:
identifying a data visualization comprising a graph image;
determining a set of graph-type correlation scores for the graph image, the set of graph-type correlation scores to include a graph-type correlation score for each graph type of a plurality of graph types, each graph-type correlation score based on a comparison of at least a portion of the graph image with one or more graph-type models associated with each graph type of the plurality of graph types;
evaluating the set of graph-type correlation scores to identify a graph type of the graph image;
retrieving a set of patterns based on the graph type of the graph image, each pattern in the set of patterns to include one or more pattern examples;
determining a set of region of interest correlation scores for the graph image based on matching the one or more pattern examples of each pattern in the set of patterns with at least a portion of the graph image, the set of region of interest correlation scores to include at least one region of interest correlation score for each pattern in the set of patterns;
evaluating the set of region of interest correlation scores to identify one or more candidate regions of interest of the graph image, each of the one or more candidate regions of interest to include a portion of the graph image;
retrieving a set of pattern models based on the set of candidate regions of interest of the graph image, each candidate region of interest in the set of candidate regions of interest associated with one pattern model in the set of pattern models, and each pattern model in the set of pattern models associated with one pattern in the set of patterns;
comparing each candidate region of interest in the set of candidate regions of interest to an associated pattern model in the set of pattern models to determine a set of pattern model correlation scores, the set of pattern model correlation scores to include a pattern model correlation score for each candidate region of interest of the one or more candidate regions of interest;
identifying one or more detected patterns based on the set of pattern model correlation scores;
retrieving one or more text templates from a computer-readable storage medium based on the one or more detected patterns, the one or more text templates to include at least one portion of text associated with each detected pattern of the one or more detected patterns, each text template of the one or more text templates associated with a priority level;
arranging the one or more text templates in an order based on the priority level associated with each text template to generate a textual description of the graph image; and
generating a personalized summary of the graph image based on the textual description with the one or more text templates ordered based on the priority level associated with each text template.

12. The computer-implemented method of claim 11, comprising:
detecting a portion of the graph image with contextual information;
extracting a textual element from the portion of the graph image with contextual information; and
inserting at least a portion of the textual element extracted from the portion of the graph image with contextual information into at least one text template of the one or more text templates to generate the textual description of the graph image.

13. The computer-implemented method of claim 11, comprising:
identifying a component of the graph image based on the graph type;
detecting a portion of the graph image with potential contextual information; and
determining contextual information is absent from the portion of the graph image with potential contextual information based on the component of the graph image identified based on the graph type.

14. The computer-implemented method of claim 11, matching a pattern example of a pattern in the set of patterns with at least a portion of the graph image comprising:
overlaying at least a portion of the pattern example on the graph image in a plurality of positions; and
computing a region of interest correlation score in the set of region of interest correlation scores for each of the plurality of positions.

15. The computer-implemented method of claim 11, comprising:
receiving an additional pattern example; and
updating a pattern model in the set of pattern models based on the additional pattern example.

16. The computer-implemented method of claim 11, each pattern model correlation score to indicate a likelihood of a respective candidate region of interest of the one or more candidate regions of interest including an associated pattern.

17. The computer-implemented method of claim 11, comprising:
presenting the one or more text templates arranged based on the priority level associated with each template sentence via a user interface;
arranging the one or more text templates in an updated order based on input received via the user interface;
altering a priority level of at least one of the one or more text templates based on the updated order; and
generating the textual description of the graph image based on the priority level associated with each text template, the priority level associated with each text template to include the priority level of the at least one of the one or more text templates altered based on the updated order.

18. The computer-implemented method of claim 11, comprising:
altering the priority level of a text template based on the input received via a user interface.

19. The computer-implemented method of claim 11, wherein at least one pattern in the set of patterns comprising a personalized pattern, and comprising creating the personalized pattern based on one or more example graph images and one or more pattern examples identified in the example graph images based on input received via a user interface.

20. The computer-implemented method of claim 19, comprising associating one or more of a priority level, a template sentence, or a graph type with the personalized pattern based on input received via the user interface.

21. A computer-program product tangibly embodied in a non-transitory machine-readable storage medium, the computer-program product including instructions operable to cause a processor to perform operations comprising:
identify a data visualization comprising a graph image;
determine a set of graph-type correlation scores for the graph image, the set of graph-type correlation scores to include a graph-type correlation score for each graph type of a plurality of graph types, each graph-type correlation score based on a comparison of at least a portion of the graph image with one or more graph-type models associated with each graph type of the plurality of graph types;
evaluate the set of graph-type correlation scores to identify a graph type of the graph image;
retrieve a set of patterns based on the graph type of the graph image, each pattern in the set of patterns to include one or more pattern examples;
determine a set of region of interest correlation scores for the graph image based on matching the one or more pattern examples of each pattern in the set of patterns with at least a portion of the graph image, the set of region of interest correlation scores to include at least one region of interest correlation score for each pattern in the set of patterns;
evaluate the set of region of interest correlation scores to identify one or more candidate regions of interest of the graph image, each of the one or more candidate regions of interest to include a portion of the graph image;
retrieve a set of pattern models based on the set of candidate regions of interest of the graph image, each candidate region of interest in the set of candidate regions of interest associated with one pattern model in the set of pattern models, and each pattern model in the set of pattern models associated with one pattern in the set of patterns;
compare each candidate region of interest in the set of candidate regions of interest to an associated pattern model in the set of pattern models to determine a set of pattern model correlation scores, the set of pattern model correlation scores to include a pattern model correlation score for each candidate region of interest of the one or more candidate regions of interest;
identify one or more detected patterns based on the set of pattern model correlation scores;
retrieve one or more text templates from a computer-readable storage medium based on the one or more detected patterns, the one or more text templates to include at least one portion of text associated with each detected pattern of the one or more detected patterns, each text template of the one or more text templates associated with a priority level;
arrange the one or more text templates in an order based on the priority level associated with each text template to generate a textual description of the graph image; and
generate a personalized summary of the graph image based on the textual description with the one or more text templates ordered based on the priority level associated with each text template.

22. The computer-program product of claim 21, including instructions operable to cause the processor to perform operations comprising:
detect a portion of the graph image with contextual information;
extract a textual element from the portion of the graph image with contextual information; and
insert at least a portion of the textual element extracted from the portion of the graph image with contextual information into at least one text template of the one or more text templates to generate the textual description of the graph image.

23. The computer-program product of claim 21, including instructions operable to cause the processor to perform operations comprising:
identify a component of the graph image based on the graph type;
detect a portion of the graph image with potential contextual information; and
determine contextual information is absent from the portion of the graph image with potential contextual information based on the component of the graph image identified based on the graph type.

24. The computer-program product of claim 21, wherein to match a pattern example of a pattern in the set of patterns with at least a portion of the graph image the computer-program product includes instructions operable to cause the processor to perform operations comprising:
overlay at least a portion of the pattern example on the graph image in a plurality of positions; and
compute a region of interest correlation score in the set of region of interest correlation scores for each of the plurality of positions.

25. The computer-program product of claim 21, including instructions operable to cause the processor to perform operations comprising:
receive an additional pattern example; and
update a pattern model in the set of pattern models based on the additional pattern example.

26. The computer-program product of claim 21, each pattern model correlation score to indicate a likelihood of a respective candidate region of interest of the one or more candidate regions of interest including an associated pattern.

27. The computer-program product of claim 21, including instructions operable to cause the processor to perform operations comprising:
present the one or more text templates arranged based on the priority level associated with each template sentence via a user interface;
arrange the one or more text templates in an updated order based on input received via the user interface;
alter a priority level of at least one of the one or more text templates based on the updated order; and
generate the textual description of the graph image based on the priority level associated with each text template, the priority level associated with each text template to include the priority level of the at least one of the one or more text templates altered based on the updated order.

28. The computer-program product of claim 21, including instructions operable to cause the processor to perform operations comprising:

alter the priority level of a text template based on the input received via a user interface.

29. The computer-program product of claim 21, at least one pattern in the set of patterns comprising a personalized pattern, and the computer-program product including instructions operable to cause the processor to perform operations comprising:

create the personalized pattern based on one or more example graph images and one or more pattern examples identified in the example graph images based on input received via a user interface.

30. The computer-program product of claim 29, including instructions operable to cause the processor to perform operations comprising:

associate one or more of a priority level, a template sentence, or a graph type with the personalized pattern based on input received via the user interface.

* * * * *